US012657753B2

(12) United States Patent
Diem et al.

(10) Patent No.: US 12,657,753 B2
(45) Date of Patent: Jun. 16, 2026

(54) HAND POSE-DEPENDENT SCALE ESTIMATION FOR EXTENDED REALITY

(71) Applicant: Snap Inc., Santa Monica, CA (US)

(72) Inventors: Markus Diem, Vienna (AT); Thomas Muttenthaler, Vienna (AT); Daniel Wolf, Mödling (AT); Jeremias Beyene Yehdegho, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/883,633

(22) Filed: Sep. 12, 2024

(65) Prior Publication Data

US 2026/0073545 A1 Mar. 12, 2026

(51) Int. Cl.
| | |
|---|---|
| *G06T 7/60* | (2017.01) |
| *G06F 3/01* | (2006.01) |
| *G06T 7/246* | (2017.01) |
| *G06T 7/292* | (2017.01) |
| *G06T 7/593* | (2017.01) |
| *G06T 7/73* | (2017.01) |

(52) U.S. Cl.
CPC ................ *G06T 7/60* (2013.01); *G06F 3/011* (2013.01); *G06T 7/246* (2017.01); *G06T 7/292* (2017.01); *G06T 7/593* (2017.01); *G06T 7/73* (2017.01); *G06T 2207/10012* (2013.01); *G06T 2207/20084* (2013.01); *G06T 2207/30196* (2013.01)

(58) Field of Classification Search
CPC ........... G06T 7/60; G06T 7/246; G06T 7/292; G06T 7/593; G06T 7/73; G06T 2207/10012; G06T 2207/20084; G06T 2207/30196; G06F 3/011
See application file for complete search history.

(56) References Cited

U.S. PATENT DOCUMENTS

| | | | |
|---|---|---|---|
| 7,971,156 | B2 | 6/2011 | Albertson et al. |
| 8,335,348 | B2 | 12/2012 | Srikrishnan et al. |
| 9,225,897 | B1 | 12/2015 | Sehn et al. |
| | | (Continued) | |

FOREIGN PATENT DOCUMENTS

| | | |
|---|---|---|
| EP | 3707693 A1 | 9/2020 |
| EP | 4172726 A1 | 5/2023 |
| | (Continued) | |

OTHER PUBLICATIONS

US 12,013,985 B1, 06/2024, Stolzenberg et al. (withdrawn)

(Continued)

*Primary Examiner* — Adam R. Giesy
(74) *Attorney, Agent, or Firm* — Schwegman Lundberg & Woessner, P.A.

(57) ABSTRACT

Examples in the present disclosure relate to scale estimation for facilitating extended reality (XR) experiences. An image of a hand of a user is captured via one or more optical sensors of an XR device. The image is processed to detect a hand pose relative to the XR device. A hand scale estimate corresponding to the detected hand pose is accessed. The hand scale estimate is one of a plurality of hand scale estimates each uniquely associated with a respective hand pose. The hand scale estimate is applied to generate positional data for one or more features of the hand of the user. The XR device tracks the hand of the user based on the positional data while the user uses the XR device.

20 Claims, 15 Drawing Sheets

(56) References Cited

U.S. PATENT DOCUMENTS

| | | | |
|---|---|---|---|
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,591,730 | B2 | 3/2020 | Rodriguez, II et al. |
| 10,614,855 | B2 | 4/2020 | Huang |
| 10,706,584 | B1 * | 7/2020 | Ye .......................... G06F 18/214 |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 11,798,201 | B2 | 10/2023 | Eirinberg et al. |
| 11,861,801 | B2 | 1/2024 | Gurgul et al. |
| 11,989,843 | B2 | 5/2024 | Zhou et al. |
| 2019/0146219 | A1 | 5/2019 | Rodriguez, II |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0301231 | A1 | 9/2022 | Eirinberg et al. |
| 2022/0326781 | A1 | 10/2022 | Hwang et al. |
| 2022/0334649 | A1 | 10/2022 | Hwang et al. |
| 2022/0375174 | A1 | 11/2022 | Arya et al. |
| 2023/0350427 | A1 | 11/2023 | Hintermann et al. |
| 2023/0418062 | A1 | 12/2023 | Wawruch |
| 2023/0418385 | A1 | 12/2023 | Feinman et al. |
| 2024/0013493 | A1 | 1/2024 | Arya et al. |
| 2024/0013498 | A1 * | 1/2024 | Sato ..................... G06V 40/107 |
| 2024/0070992 | A1 | 2/2024 | Lucas |
| 2024/0087609 | A1 | 3/2024 | Goodrich et al. |
| 2024/0127006 | A1 | 4/2024 | Zhou et al. |
| 2024/0187814 | A1 | 6/2024 | Arya et al. |
| 2024/0193866 | A1 | 6/2024 | Verdie et al. |
| 2024/0193982 | A1 | 6/2024 | Gurgul et al. |
| 2024/0203072 | A1 | 6/2024 | Solichin |
| 2024/0288946 | A1 | 8/2024 | Evangelidis et al. |
| 2024/0289975 | A1 | 8/2024 | Viehauser |

FOREIGN PATENT DOCUMENTS

| | | |
|---|---|---|
| EP | 4172730 A1 | 5/2023 |
| KR | 20220158824 A | 12/2022 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023192386 A1 | 10/2023 |
| WO | WO-2023220163 A1 | 11/2023 |
| WO | WO-2023244490 A1 | 12/2023 |
| WO | WO-2024049578 A1 | 3/2024 |
| WO | WO-2024049579 A1 | 3/2024 |
| WO | WO-2024063865 A1 | 3/2024 |

OTHER PUBLICATIONS

Chen, Ching-Hang, et al., "Unsupervised 3d pose estimation with geometric self- supervision", Proceedings of the IEEE/CVF conference on computer vision and pattern recognition, (2019), 11 pgs.

Erol, Ali, et al., "Vision-based hand pose estimation: A Review", Computer Vision and Image Understanding, Academic Press, U.S., vol. 108, No. 1-2, (Sep. 1, 2007), 52-73.

Li, Rui, et al., "A survey on 3D hand pose estimation: Cameras, methods, and datasets", Pattern Recognition 93, (2019), 251-272.

Ramakrishna, Varun, et al., "Reconstructing 3D Human Pose from 2D Image Landmarks", Computer Vision—ECCV 2012: 12th European Conference on Computer Vision, Florence, Italy, Oct. 7-13, 2012, Proceedings, Part IV 12. Springer Berlin Heidelberg, (2012), 14 pgs.

"International Application Serial No. PCT/US2025/044713, International Search Report mailed Nov. 19, 2025", 4 pgs.

"International Application Serial No. PCT/US2025/044713, Written Opinion mailed Nov. 19, 2025", 8 pgs.

"International Application Serial No. PCT/US2025/044947, International Search Report mailed Dec. 8, 2025", 4 pgs.

"International Application Serial No. PCT/US2025/044947, Written Opinion mailed Dec. 8, 2025", 6 pgs.

Yoon, Youngrock, et al., "A New Kalman-Filter-Based Framework for Fast and Accurate Visual Tracking of Rigid Objects", IEEE Transactions on Robotics, 24(5), (2008), 1238-1251.

Yu, Rui, et al., "Be Real in Scale: Swing for True Scale in Dual Camera Mode", IEEE International Symposium on Mixed and Augmented Reality (ISMAR), IEEE, pp. 1231-1239, (Oct. 16, 2023), 9 pgs.

* cited by examiner

400

REAL-WORLD ENVIRONMENT

410

HAND POSE-DEPENDENT SCALE ESTIMATION FOR EXTENDED REALITY

TECHNICAL FIELD

Subject matter in the present disclosure relates, generally, to extended reality (XR) devices and XR experiences. More specifically, but not exclusively, the subject matter relates to scale estimation operations that are performed to facilitate XR experiences.

BACKGROUND

Many XR devices include tracking systems. For example, a tracking system of an XR device processes images captured by the XR device to determine positions of landmarks or other visual features in a scene. The positional data can be used by the XR device to facilitate tracking of an object, such as a hand of a user, within a field of view of the XR device.

Some XR devices use hand gestures as an input. This enables a user to interact with an XR device without a traditional input device, such as a touchpad or controller, but typically requires swift and accurate detection and tracking of the hand.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
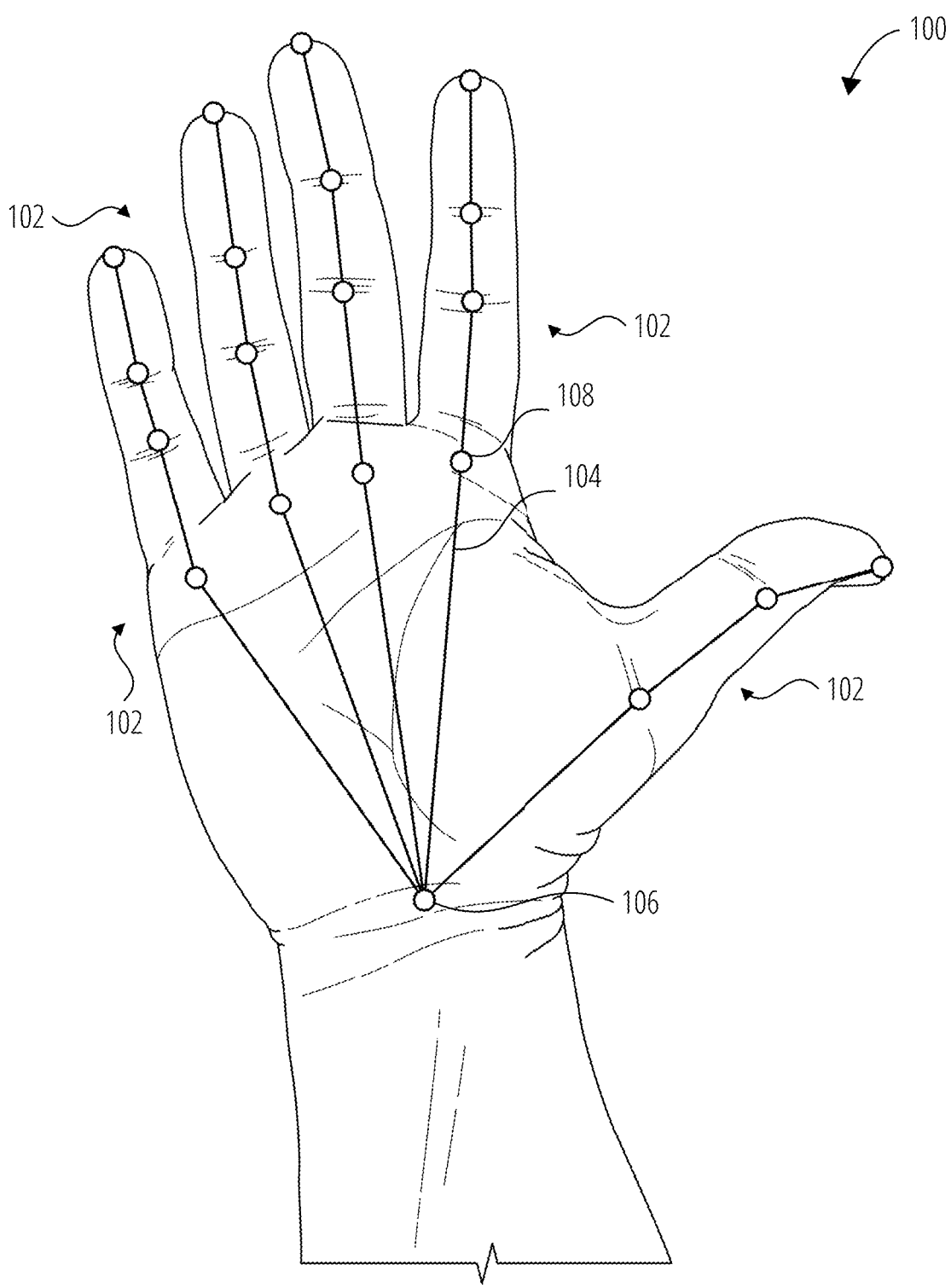
FIG. 1 illustrates multiple landmarks relative to an anterior view of a hand, according to some examples.

The description that follows describes systems, devices, methods, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

XR devices can include augmented reality (AR) devices or virtual reality (VR) devices. "Augmented reality" (AR) can include an interactive experience of a real-world environment where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or 3D registration of virtual and real objects. In some examples, a user of an AR system can perceive or interact with virtual content that appears to be overlaid on or attached to a real-world physical object. The term "AR application" is used herein to refer to a computer-operated application that enables an AR experience.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While examples described in the present disclosure focus primarily on XR devices that provide an AR experience, it will be appreciated that one or more aspects of the present disclosure may also be applied to VR.

Since human hands have different sizes, a calibration operation may be performed by the XR device to obtain a hand scale estimate (e.g., a value that is representative of the overall scale of the hand). The hand scale estimate allows for improved tracking of the hand. For example, a hand scale estimate is applied by the XR device to generate more accurate depth estimations with respect to a hand appearing in the field of view. An example of a hand scale estimate is a bone length estimate. This bone length estimate can be referred to as a "representative bone length" since it is used to represent the overall scale of the hand.

Examples in the present disclosure provide a dynamic approach to hand scale estimation for XR devices. Hand tracking can be improved by maintaining multiple hand scale estimates for different hand poses, allowing for more accurate hand tracking across various orientations and, as a result, better quality interactions within XR environments.

In some examples, the available resources of an XR device (e.g., processor and battery resources) are more efficiently utilized by dynamically switching between multi-camera and single-camera modes. For example, the XR device avoids using a multi-camera mode for hand scale estimation when a suitable hand scale estimate is already available. This can reduce power consumption and extend the operational time of XR devices without compromising on tracking accuracy.

As mentioned, an XR device may generate a hand scale estimate for a hand within its field of view. An example of a hand scale estimate is an estimate of the length of a particular bone, such as the index finger metacarpal bone (the bone that connects the wrist to the index finger). This hand scale estimate is representative of the overall object scale. However, it will be appreciated that various other types of hand scale estimates may be utilized to represent scale, and the index finger metacarpal bone is mentioned in the present disclosure primarily to illustrate certain examples.

An XR device can use cameras to capture images of the hand. Cameras capture the non-rigid surfaces of the hand and not the internal bones, potentially leading to variations in hand scale estimations depending on camera angle and hand pose. Accordingly, an estimate for the scale of the hand, as generated differently by the XR device, may differ depending on the hand pose relative to the XR device (e.g., relative to the camera or cameras of the XR device capturing the hand).

Various factors can contribute to the technical problem of varying hand scale estimates. Training data used for hand tracking machine learning models may come from diverse sources with heterogeneous ground truth definitions. A common issue across training datasets is that they may include at least some training items where landmarks are annotated on the hand's surface rather than the internal skeletal structure. For example, where an image of a hand that is shown from the side is annotated, annotations may be relatively close to the actual internal joints of the hand. Contrastingly, where an image of a hand that shows the palm facing the camera is annotated, annotations may simply be made on the surface of the hand, further away from the actual internal joints. This leads to inconsistencies in landmark definitions. As a result, when the trained hand tracking machine learning model is subsequently used to generate landmarks for a particular hand, the relative positions of the landmarks may be influenced by the pose in which the hand is captured.

In some examples, hand scale estimation is performed in a multi-camera mode. For example, the hand is captured from two different camera views to obtain stereo image data, and the stereo image data is processed to measure a particular bone length that is to be used as the hand scale estimate. This may be referred to as a scale calibration operation, or simply a calibration operation in the context of the present disclosure.

Following the calibration operation, depth estimation can be performed in a single-camera mode using a neural network that is trained to infer relative depth of hand landmarks based on their two-dimensional (2D) positions and the measured bone length. For example, by inputting the measured bone length, the XR device can infer 3D landmarks with absolute depth from a single camera stream. This allows for hand tracking in the single-camera mode after completing the calibration operation in the multi-camera mode, thereby extending the overall field of view of the XR device beyond a camera overlap region (which is used in the multi-camera mode) and reducing power consumption (since it enables tracking in areas where only one camera has visibility).

However, due to aforementioned technical issues, the measurement used as the hand scale estimate (e.g., the bone length estimate) may be impacted by the hand pose relative to the camera. The hand scale estimate may be sufficiently accurate for the hand pose that was used during the calibration operation, but not sufficiently accurate for other hand poses, thereby degrading the quality of the XR experience.

Figure 2:
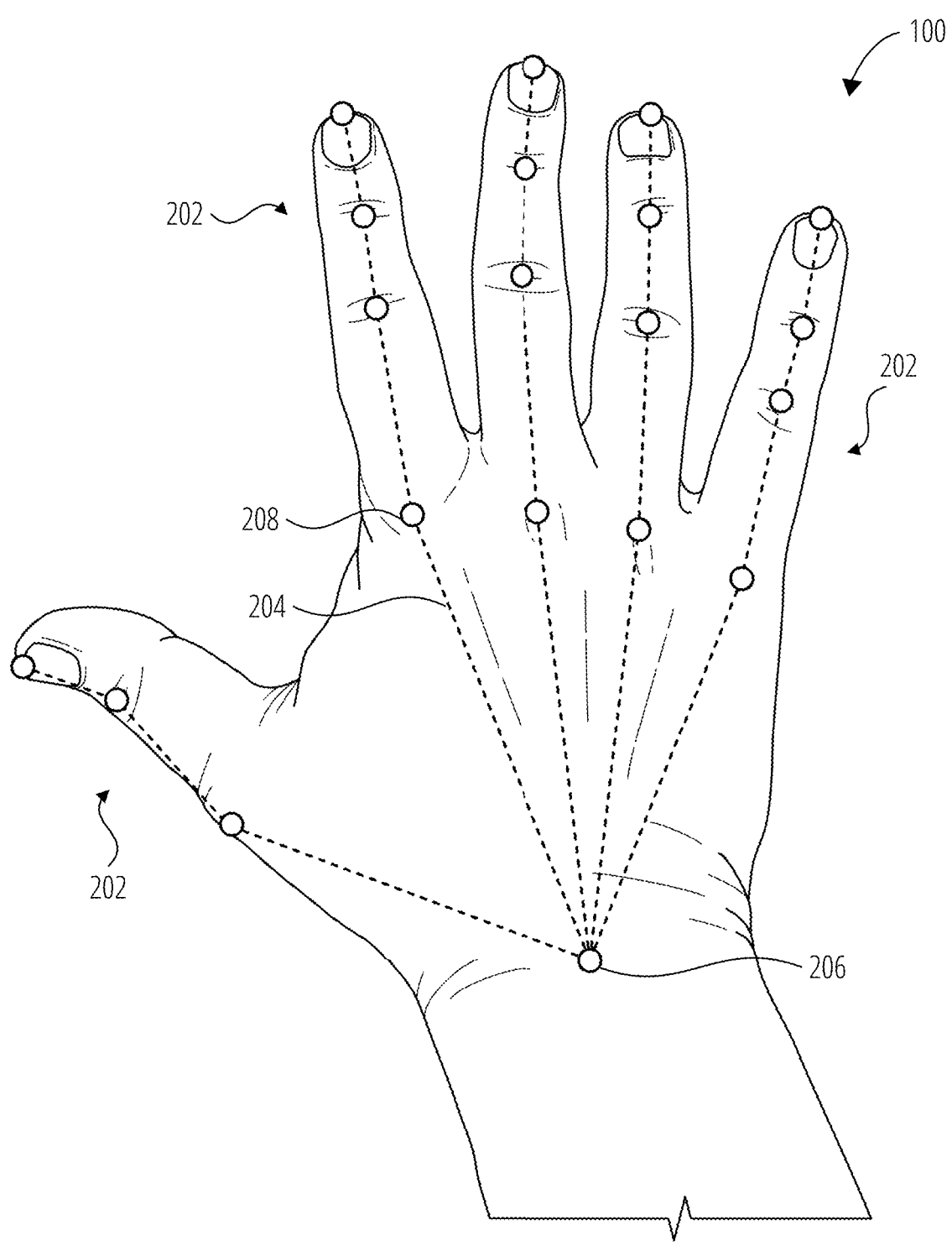
FIG. 2 illustrates multiple landmarks relative to a posterior view of the hand of FIG. 1, according to some examples.
Figure 3:
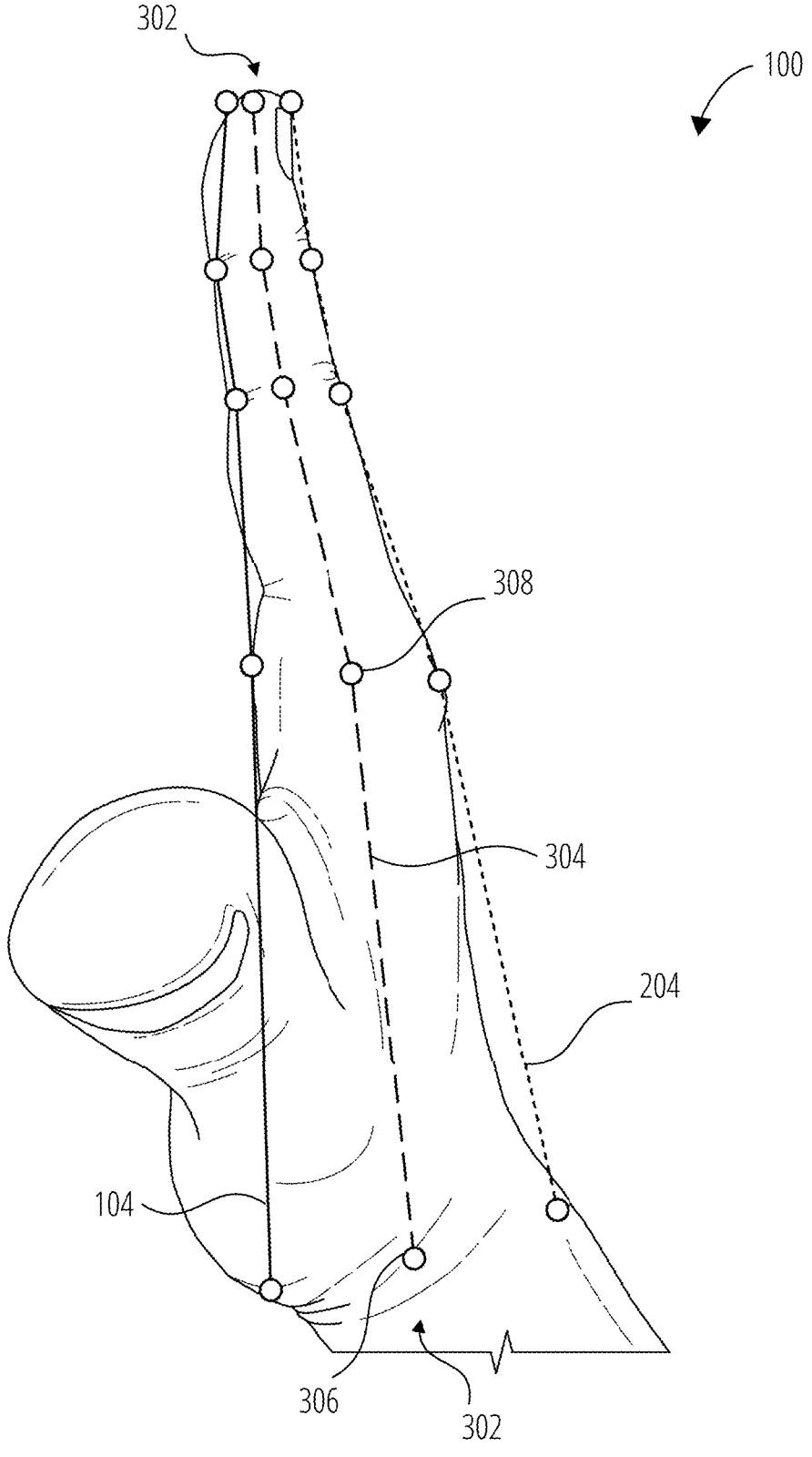
FIG. 3 illustrates multiple landmarks relative to a side view of the hand of FIG. 1, according to some examples.

By way of example, FIGS. 1-3 illustrate different poses of a hand 100 relative to an XR device (not shown). The hand 100 is a hand of a user of the XR device. However, in other examples, techniques described herein can also be applied to perform scale estimation on other objects, such as hands of non-users or a full body of a person.

Referring firstly to FIG. 1, which shows an anterior view of the hand 100, the XR device generates a set of landmarks 102 (depicted by circular elements in FIG. 1) associated with respective joints of the hand 100. The XR device then measures the distance between two of the landmarks 102 to determine a hand scale estimate in the example form of principal bone length 104. The principal bone length 104 is the measured distance between the wrist landmark 106 and the index finger knuckle joint landmark 108, providing an estimate of the length of the index finger metacarpal bone.

A machine learning model is typically used to generate the landmarks 102. As mentioned, training data used to train the machine learning model may include training items where landmarks are annotated on a hand's surface rather than the internal skeletal structure. This "annotation bias" may be implicitly built into training data, causing the machine learning model to learn and reproduce these inconsistencies.

Thus, based on the pose of the hand in FIG. 1, the machine learning model may predict the landmarks 102 such that they are located closer to the anterior surface of the hand 100 than to the actual joint locations, as is better illustrated in FIG. 3, which shows a side view of the hand 100. The principal bone length 104 is then measured accordingly.

FIG. 2 shows a posterior view of the hand 100, as well as landmarks 202 as may be generated by the XR device (depicted by circular elements in FIG. 2). In FIG. 2, the same metric is used for the hand scale estimate: the distance between a wrist landmark 206 and an index finger knuckle joint landmark 208.

However, based on the pose of the hand in FIG. 2, the machine learning model may predict the landmarks 202 when compared to the landmarks 102, at least to some extent. In the case of FIG. 2, the landmarks 202 are located closer to the posterior surface of the hand 100 than the actual joint locations, as is better illustrated in FIG. 3. The principal bone length 204 is thus measured accordingly. As a result, even though the same hand 100 is captured in FIGS. 1 and 2, the principal bone length 104 obtained from FIG. 1 differs from the principal bone length 204 obtained from FIG. 2.

FIG. 3 further illustrates landmarks 302 that are generated by the XR device when the hand 100 is captured from the side. In this case, the landmarks 302 are better aligned with the internal skeletal structure. Once again, a principal bone length 304, as measured between a wrist landmark 306 and an index finger knuckle joint landmark 308 of the landmarks 302 of FIG. 3, differs at least to some extent from the estimates obtained from FIG. 1 and FIG. 2. There are thus discrepancies in the hand scale estimate between the different poses.

FIGS. 1-3 illustrate how the pose of the hand 100 relative to the XR device can influence the hand scale estimate (e.g., the estimated principal bone length). As a result, if the XR device only obtains a single hand scale estimate from a single hand pose (e.g., during an initial calibration phase when a user starts using the XR device), and uses that hand scale estimate continuously to provide an XR experience (e.g., to present virtual content as overlaid onto the hand 100 of the user), errors in depth estimation may arise, especially when the hand pose changes significantly relative to the initial hand pose that was used to generate the hand scale estimate.

For example, it is assumed that the same hand scale estimate is used throughout a user session of a user operating a head-wearable XR device. Based on that hand scale estimate, the XR device might estimate that the hand of the user is a certain distance away from the XR device, and then generate virtual content that is intended to appear in front of the hand from the perspective of the user. The virtual content might, for instance, be a virtual apple that is intended to be presented so as to appear in the palm of the hand. However, as a result of rotation of the hand to a different pose relative to the pose in which the hand scale estimate was initially obtained, the XR device incorrectly estimates the depth of the hand, and generates the apple so as to appear too far away, with the hand essentially appearing closer to the user than the apple. This degrades the quality of the XR experience.

Examples described in the present disclosure address technical challenges to compensate for differences in hand scale estimates by maintaining a data structure with various scale estimates, each associated with a particular hand pose. In some examples, a new hand scale estimate is triggered when a new hand pose is detected, while an existing hand scale estimate is used when a previously detected hand pose is again detected.

A method according to some examples is performed by an XR device that has one or more optical sensors. For example, the XR device is a head-mounted XR device with a plurality of cameras.

The method includes capturing at least one image of a hand of a user of the XR device, and processing the at least one image to detect a hand pose relative to the XR device. The method further includes accessing a hand scale estimate corresponding to the detected hand pose. The hand scale estimate is one of a plurality of hand scale estimates, each uniquely associated with a respective hand pose. The hand scale estimate is applied to generate positional data for one or more features of the hand of the user. The XR device tracks the hand based on the positional data while the user is using the XR device.

In some examples, the positional data comprises 3D positions related to one or more landmarks on the hand that are tracked by the XR device. The positional data may include absolute depth information related to the one or more landmarks. For example, the hand scale estimate to generate the positional data includes applying the hand scale estimate to obtain the absolute depth information from relative depth information related to the one or more landmarks. In some examples, before obtaining the absolute depth information, the XR device executes a machine learning model (e.g., a neural network) to generate the relative depth information based on 2D positions related to the one or more landmarks.

A "hand pose," as used in the present disclosure, may include one more of the orientation, configuration, or spatial arrangement of a hand (e.g., relative to one or more cameras or other sensors of an XR device). The hand pose may include the orientation, configuration, or spatial arrangement of the hand or part thereof, such as the palm, a finger, a thumb, or combinations thereof. A hand pose may, but need not necessarily, include a position associated with the hand. For example, a hand pose may include a translation and rotation of the hand, or part thereof, in 3D space relative to the XR device (e.g., the camera of the XR device).

A hand pose may be characterized by various features, parameters, or factors, including, for example: the orientation of the plane of the palm relative to the camera, one or more vectors defined by the hand or its landmarks relative the camera, a plane fitting the one or more vectors, a measure of rotation of the hand relative to the camera, configuration of the fingers (e.g., extended, forming a fist, or an intermediate position), a particular gesture, or combinations thereof.

In some examples, a hand pose is determined by processing images captured by one or more optical sensors of the XR device to identify the positions of landmarks and their spatial relationships. The granularity of hand pose detection may be adjusted, allowing for a range of pose distinctions from broad categories (e.g., palm facing camera, palm perpendicular to camera) to more nuanced distinctions that account for subtle changes in finger positions or wrist rotation.

A "hand scale estimate," as used herein, may include a measurement or set of measurements that represent the size of a hand or specific parts of the hand, such as one or more estimated bone lengths. A hand scale estimate may be derived from stereo camera data through, for instance, a process of 3D triangulation on visible hand landmarks, where the distances between connected landmarks are measured to determine their respective sizes. For example, a hand scale estimate may include an estimated length of a thumb metacarpal bone, an index finger metacarpal bone, both lengths, or a combination or aggregate measure.

In some examples, the method includes detecting a first hand pose and obtaining a first hand scale estimate for the first hand pose. The method then includes, after detecting the first hand pose, detecting that the hand has assumed a second hand pose that differs from the first hand pose. The XR device determines, for example, that the second hand pose corresponds to one of the respective hand poses associated with the plurality of hand scale estimates, and then accesses a second hand scale estimate associated with the corresponding one of the respective hand poses. The second hand scale estimate differs from the first hand scale estimate and is applied to generate further positional data. Accordingly, during a first stage, the XR device tracks the hand using the first hand scale estimate, and during a second stage, the XR device further tracks the hand of the user using the second hand scale estimate.

In some examples, the XR device determines that the detected hand pose does not correspond to any existing hand scale estimate. In response, the XR device triggers commencement of a calibration operation to obtain a hand scale estimate, and then associates the hand scale estimate with the detected hand pose. In some examples, the XR device updates the plurality of hand scale estimates by adding the hand scale estimate to a set of existing hand scale estimates.

As mentioned, in some examples, the calibration operation is performed in a multi-camera mode, while the tracking of the hand after the calibration operation is performed in a single-camera mode. The method may include automatically switching from the multi-camera mode to the single-camera mode after the generation of the hand scale estimate.

For example, in the single-camera mode, the XR device relies on a previously generated hand scale estimate to generate 3D positional coordinates, including depth information, from a single camera's image frames. The single-camera mode may involve running a hand tracker on the images from a single camera to obtain 2D positional information, and then using a neural network (which may be referred to as a "lifter" network) to infer the depth of hand landmarks. In some examples, the depth information is initially obtained as relative information, which can then be transformed to absolute depth information using the hand scale estimate.

In some examples, a lifter component or system takes, as input, a hand scale estimate (e.g., a reference bone length obtained from a scale estimation) and 2D positional information, and processes this data to predict normalized landmarks. The normalized landmarks are 3D landmarks expressed relative to the hand scale estimate, and only need to be multiplied by the hand scale estimate to obtain absolute 3D landmarks.

In the multi-camera mode, input data from two or more cameras of the XR device is utilized. For example, the multi-camera mode is employed during calibration operations when a new hand pose is detected that does not sufficiently correspond to any existing hand scale estimates. In the multi-camera mode, the XR device can utilize stereo vision principles to reconstruct 3D positions of hand landmarks and obtain scale estimates.

It is noted that a "single-camera mode," as used herein, may refer to using a single camera's image frame(s) for a particular point in time or period of time. However, in some examples, the XR device may switch between different cameras over time while still being in the "single-camera mode." For example, images from a first camera captured in a first period are selected for processing at a first stage, while images from a second camera captured in a second period are selected for processing at a second stage following the first stage. In this way, the XR device remains in the "single-camera mode" but can benefit from camera views of different cameras at different points in time. On the other hand, when in the "multi-camera mode," the XR device may select and process images from multiple cameras captured simultaneously to benefit, for example, from stereo vision principles.

Examples described herein provide a practical application that enables an XR device to generate accurate data, such as depth estimations. This may allow for more accurate hand tracking, more accurate positioning of virtual content, improved user experience, or more natural user interactions.

Examples in the present disclosure address or alleviate technical issues arising from inconsistent hand scale estimates between different hand poses. As mentioned, these inconsistencies can arise from limitations in training data annotation, where landmarks are typically marked on the hand's surface rather than the internal skeleton, or are otherwise inconsistently marked. Examples herein enable the XR device to use hand scale estimates that are suitable for a particular hand pose, and to dynamically adapt to changing hand poses.

Technical problems that are inherent in certain machine learning models can thus be addressed or alleviated without having to incur significant costs or use significant computing resources to train new machine learning models. Instead, the problems are automatically addressed at the inference stage, obviating the need for new model training or changes in the underlying model architecture.

In some examples, the XR device can save power by running a "mono-tracker" (e.g., operating in a single-camera mode) for longer periods during a user session, and only switching to a "multi-tracker" (e.g., operating in the multi-camera mode) when a new hand scale estimate is to be generated. Furthermore, when using multiple different cameras at different times while staying in the "mono-tracker" setting, it can also provide the benefit of extending the effective field of view of the XR device compared to the use of the "multi-tracker" setting that limits the field of view to an area of overlap between the relevant cameras. For example, the XR device can use two available cameras to run "mono-tracking." Only one of the two cameras is used at a given point in time, but the "mono-tracker" can switch between the two cameras over time. When comparing this configuration with the use of the same two cameras for "stereo tracking" (in which the cameras as used at the same time), the XR device is not constrained to the stereo overlap area of the two cameras and can effective track objects in a larger field of view. This thus allows the XR device, in some examples, to perform hand tracking in a larger overall zone when more extensively using "mono-tracking."

Figure 4:
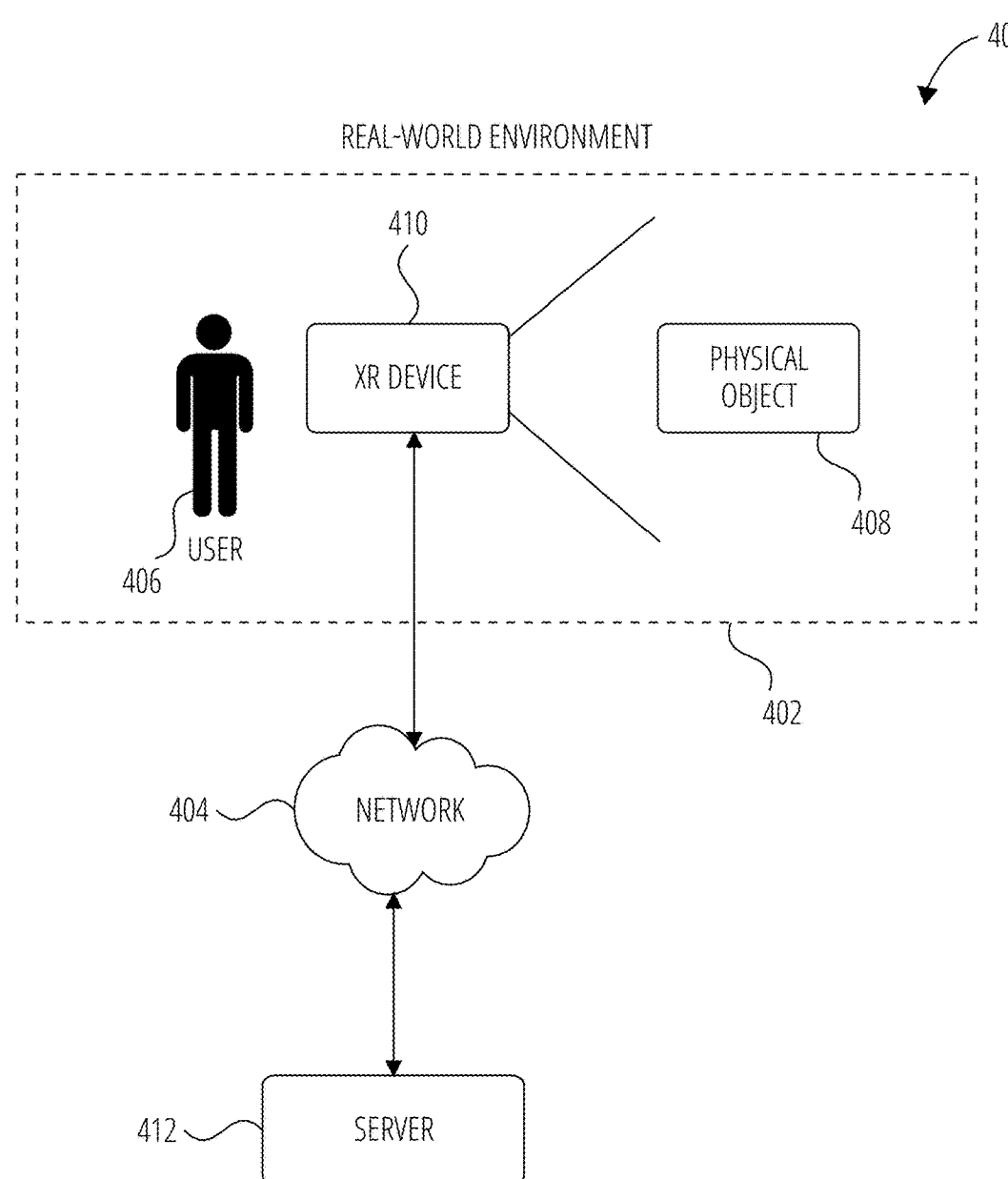
FIG. 4 is a block diagram illustrating a network environment for operating an XR device, according to some examples.

FIG. 4 is a network diagram illustrating a network environment 400 suitable for operating an XR device 410, according to some examples. The network environment 400 includes an XR device 410 and a server 412, communicatively coupled to each other via a network 404. The server 412 may be part of a network-based system. For example, the network-based system may be or include a cloud-based server system that provides additional information, such as virtual content (e.g., 3D models of virtual objects, or augmentations to be applied as virtual overlays onto images depicting real-world scenes) to the XR device 410.

A user 406 operates the XR device 410. The user 406 may be a human user (e.g., a human being), a machine user (e.g., a computer configured by a software program to interact with the XR device 410), or any suitable combination thereof (e.g., a human assisted by a machine or a machine supervised by a human). The user 406 is not part of the network environment 400, but is associated with the XR device 410. For example, where the XR device 410 is a head-wearable apparatus, the user 406 wears the XR device 410 during a user session.

The XR device 410 may have different display arrangements. In some examples, the display arrangement may include a screen that displays what is captured with a camera of the XR device 410. In some examples, the display of the device may be transparent or semi-transparent. In some examples, the display may be non-transparent and wearable by the user to cover the field of vision of the user.

The user 406 operates an application of the XR device 410, referred to herein as an AR application. The AR application may be configured to provide the user 406 with an experience triggered or enhanced by a physical object 408, such as a 2D physical object (e.g., a picture), a 3D physical object (e.g., a statue), a location (e.g., at factory), or any references (e.g., perceived corners of walls or furniture, or Quick Response (QR) codes) in the real-world physical environment. For example, the user 406 may point a camera of the XR device 410 to capture an image of the physical object 408 and a virtual overlay may be presented over the physical object 408 via the display.

Experiences may also be triggered or enhanced by a hand or other body part of the user 406. For example, the XR device 410 detects and responds to hand gestures. The XR device 410 may also present information content or control items, such as user interface elements, to the user 406 during a user session.

The XR device 410 includes one or more tracking systems or tracking components (not shown in FIG. 4). The tracking components track the pose (e.g., position and orientation) of the XR device 410 relative to a real-world environment 402 using image sensors (e.g., depth-enabled 3D camera, or image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 410 within the real-world environment 402. The tracking components can also track the pose of real-world objects, such as the physical object 408 or the hand of the user 406.

In some examples, the server 412 is used to detect and identify the physical object 408 based on sensor data (e.g., image and depth data) from the XR device 410, and determine a pose of the XR device 410 and the physical object 408 based on the sensor data. The server 412 can also generate a virtual object or other virtual content based, for example, on the pose of the XR device 410 and the physical object 408.

In some examples, the server 412 communicates virtual content to the XR device 410. In other examples, the XR device 410 obtains virtual content through local retrieval or generation. The XR device 410 or the server 412, or both, can perform image processing, object detection, and object tracking functions based on images captured by the XR device 410 and one or more parameters internal or external to the XR device 410.

The object recognition, tracking, and AR rendering can be performed on either the XR device 410, the server 412, or a combination between the XR device 410 and the server 412. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

Machines, components, or devices shown in FIG. 4 may be implemented in a general-purpose computer modified (e.g., configured or programmed) by software to be a special-purpose computer to perform one or more of the functions described herein for that machine, component, or device. For example, a computer system able to implement one or more of the methodologies described herein is discussed below with respect to FIG. 15. Two or more of the machines, components, or devices illustrated in FIG. 4 may be combined into a single machine, and the functions described herein for any single machine, component, or device may be subdivided among multiple machines, component, or devices.

The network 404 may be any network that enables communication between or among machines (e.g., server 412), databases, and devices (e.g., XR device 410). Accordingly, the network 404 may be a wired network, a wireless network (e.g., a mobile or cellular network), or any suitable network (e.g., a mobile or cellular network), or any suitable combination thereof. The network 404 may include one or more portions that constitute a private network, a public network (e.g., the Internet), or any suitable combination thereof.

Figure 5:
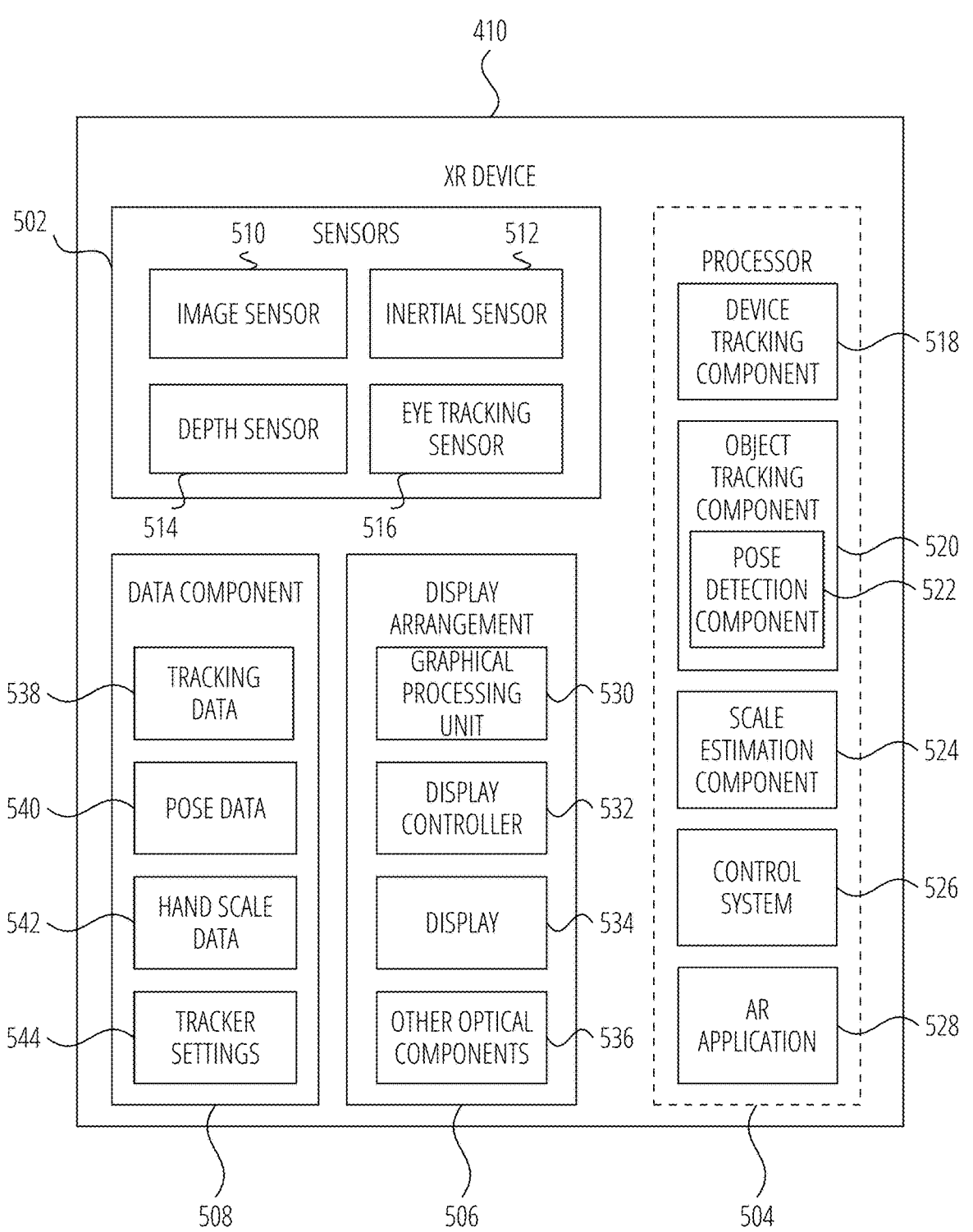
FIG. 5 is a block diagram illustrating components of an XR device, according to some examples.

FIG. 5 is a block diagram illustrating components (e.g., modules, parts, systems, or subsystems) of the XR device 410, according to some examples. The XR device 410 is shown to include sensors 502, a processor 504, a display arrangement 506, and a data component 508. It will be appreciated that FIG. 5 is not intended to provide an exhaustive indication of components of the XR device 410.

The sensors 502 include one or more image sensors 510, one or more inertial sensors 512, one or more depth sensors 514, and one or more eye tracking sensors 516. The image sensor 510 includes one or more of a color camera, a thermal camera, or a grayscale, global shutter tracking camera. The image sensor 510 may include more than one of the same cameras (e.g., multiple color cameras). In some examples, the XR device 410 includes at least two cameras to capture images of an object from at least two camera views, thereby enabling the XR device 410 to perform triangulation to generate 3D position information related to the object.

The inertial sensor 512 includes, for example, a combination of a gyroscope, accelerometer, and a magnetometer. In some examples, the inertial sensor 512 includes one or more Inertial Measurement Units (IMUs). An IMU enables tracking of movement of a body by integrating the acceleration and the angular velocity measured by the IMU. An IMU may include a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement. In some examples, the magnetic field is measured by the magnetometer to provide a reference for orientation, helping to correct any drift in the gyroscope and/or accelerometer measurements, thereby improving the overall accuracy and stability of the estimations.

The depth sensor 514 may include one or more of a structured-light sensor, a time-of-flight sensor, a passive stereo sensor, and an ultrasound device. The eye tracking sensor 516 is configured to monitor the gaze direction of the user, providing data for various applications, such as adjusting the focus of displayed content or determining a zone of interest in the field of view. The XR device 410 may include one or multiple eye tracking sensors 516, such as infrared eye tracking sensors, corneal reflection tracking sensors, or video-based eye-tracking sensors.

Other examples of sensors 502 include a proximity or location sensor (e.g., near field communication, GPS, Bluetooth™, Wi-Fi™), an audio sensor (e.g., a microphone), or any suitable combination thereof. It is noted that the sensors 502 described herein are for illustration purposes and the sensors 502 are thus not limited to the ones described above.

The processor 504 implements or causes execution of a device tracking component 518, an object tracking component 520 that includes a pose detection component 522, a scale estimation component 524, a control system 526, and an AR application 528.

The device tracking component 518 estimates a pose of the XR device 410. For example, the device tracking component 518 uses data from the image sensor 510 and the inertial sensor 512 to track the pose of the XR device 410 relative to a frame of reference (e.g., real-world environment 402). In some examples, the device tracking component 518 uses tracking data to determine the 3D pose of the XR device 410. The 3D pose is a determined position of the XR device 410 in relation to the user's real-world environment 402. The pose may further include the orientation of the XR device 410 in relation to the real-world environment 402 (e.g., providing the pose in six degrees of freedom (6DOF)).

The device tracking component 518 continually gathers and uses updated sensor data describing movements of the XR device 410 to determine updated poses of the XR device 410 that indicate changes in the relative position and/or orientation of the XR device 410 from the physical objects in the real-world environment 402.

A "SLAM" (Simultaneous Localization and Mapping) system or other similar system may be used to understand and map a physical environment in real-time. This allows, for example, an XR device to accurately place digital objects in the real world and track their position as a user moves and/or as objects move. The XR device 410 may include a "VIO" (Visual-Inertial Odometry) system that combines data from an IMU and a camera to estimate the position and orientation of an object in real-time. In some examples, a VIO system may form part of a SLAM system.

The object tracking component 520 enables the detection and tracking of an object, such as the physical object 408 of FIG. 4 or a hand of a user (e.g., the hand 100 of FIG. 1). The object tracking component 520 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to detect and/or track an object in the field of view of a user during a user session.

An object tracking machine learning model may comprise a neural network trained on suitable training data to identify and/or track objects in a sequence of frames captured by the XR device 410. An object tracking machine learning model typically uses an object's appearance, motion, landmarks, and/or other features to estimate location in subsequent frames.

In some examples, the object tracking component 520 implements a landmark detection system (e.g., using a landmark detection machine learning model). In some examples, based on images captured using stereo cameras of the image sensors 510, the object tracking component 520 identifies 3D landmarks associated with joints of a hand of the user 406.

The object tracking component 520 can thus detect and track the 3D positions of various joints (or other landmarks, such as bones or other segments of the hand) on the hand as the hand moves in the field of view of the XR device 410. In some examples, positions and orientations (e.g., relative angles) of the landmarks are tracked.

In some examples, the object tracking component 520 is calibrated for a specific set of features. For example, when the object tracking component 520 performs hand tracking, a calibration component calibrates the object tracking component 520 by using a hand calibration, such as a hand scale estimate for a particular user of the XR device 410. The calibration component can perform one or more calibration steps to measure or estimate hand features, such as the size of a hand and/or details of hand landmarks (e.g., fingers and joints). This may include bone length calibrations.

As mentioned, the object tracking component 520 of FIG. 5 includes a pose detection component 522. The pose detection component 522 is configured to detect object poses, including hand poses of a user relative to the XR device 410. The pose detection component 522 may generate data representing the detected hand pose, such as one or more vectors representing the detected hand pose, or a plane formed by vectors so as to represent the orientation of the palm of the hand. Such data may be temporarily cached (e.g., as part of the pose data 540 referred to below). In some examples, the pose detection component 522 identifies a pose based on a gesture performed by the hand.

In some examples, the pose detection component 522 analyzes spatial relationships between landmarks such as finger joints, knuckles, or the wrist to determine the pose. The pose detection component 522 can detect changes in hand pose over time, allowing for dynamic tracking of hand movements and gestures. In some examples, the pose detection component 522 compares a detected hand pose to a set of previously detected hand poses to determine if it matches any existing pose or if it represents a "new" pose.

The scale estimation component 524 is responsible for generating and managing hand scale estimates corresponding to different hand poses. In some examples, the scale estimation component 524 generates, for a particular hand pose, a scale estimate using a predetermined metric (e.g., computation of a particular bone length from the landmarks detected while the hand assumed the relevant pose).

In some examples, when a new hand pose is detected by the pose detection component 522, the scale estimation component 524 determines whether a corresponding hand scale estimate exists. If not, the scale estimation component 524 triggers a calibration operation to obtain a new hand scale estimate for that pose. If a corresponding hand scale estimate already exists, the scale estimation component 524 causes the XR device 410 to use that hand scale estimate (e.g., to track the hand using the object tracking component 520 based on that hand scale estimate).

The control system 526 may control various operations of the XR device 410. In some examples, the control system 526 manages switching between multi-camera and single-camera modes for hand tracking and scale estimation. For instance, the control system 526 initiates the multi-camera mode for calibration operations and switches to the single-camera mode for regular tracking (e.g., based on a known hand scale estimate) to conserve power.

The AR application 528 performs various operations to provide an AR experience to the user. For example, the AR application 528 retrieves a virtual object (e.g., 3D object model) based on an identified physical object 408 or physical environment (or other real-world feature), or retrieves a digital effect to apply to the physical object 408. A graphical processing unit 530 of the display arrangement 506 causes display of the virtual object, digital effect, or the like. In some examples, the AR application 528 includes a local rendering engine that generates a visualization of a virtual object overlaid (e.g., superimposed upon, or otherwise displayed in tandem with) on an image of the physical object 408 (or other real-world feature) captured by the image sensor 510. A visualization of the virtual object may be manipulated by adjusting a position of the physical object or feature (e.g., its physical location, orientation, or both) relative to the image sensor 510. Similarly, the visualization of the virtual object may be manipulated by adjusting a pose of the XR device 410 relative to the physical object or feature.

The graphical processing unit 530 may include a render engine that is configured to render a frame of a 3D model of a virtual object based on the virtual content provided by the AR application 528 and the pose of the XR device 410 (and, in some cases, the position of a tracked object). In other words, the graphical processing unit 530 uses the pose of the XR device 410 to generate frames of virtual content to be presented on a display 534. For example, the graphical processing unit 530 communicates with the AR application 528 to apply the pose to render a frame of the virtual content such that the virtual content is presented at an orientation and position in the display 534 to properly augment the user's reality. As an example, the graphical processing unit 530 may use the pose data to render a frame of virtual content such that, when presented on the display 534, the virtual content is caused to be presented to a user so as to overlap with a physical object in the user's real-world environment 402.

In some examples, the AR application 528 can work with the graphical processing unit 530 to generate updated frames of virtual content based on updated poses of the XR device 410 and updated tracking data generated by the abovementioned tracking components, which reflect changes in the position and orientation of the user in relation to physical objects in the user's real-world environment 402, thereby resulting in a more immersive experience.

The graphical processing unit 530 transfers the rendered frame to a display controller 532. The display controller 532 is positioned as an intermediary between the graphical processing unit 530 and the display 534, receives the image data (e.g., rendered frame) from the graphical processing unit 530, re-projects the frame (by performing a warping process) based on a latest pose of the XR device 410 (and, in some cases, object tracking pose forecasts or predictions), and provides the re-projected frame to the display 534.

In some examples, the display 534 is not directly in the gaze path of the user. For example, the display 534 can be offset from the gaze path of the user and other optical components 536 direct light from the display 534 into the gaze path. The other optical components 536 include, for example, one or more mirrors, one or more lenses, or one or more beam splitters.

It will be appreciated that, in examples where an XR device includes multiple displays, each display can have a dedicated graphical processing unit and/or display controller. It will further be appreciated that where an XR device includes multiple displays, such as in the case of AR glasses or any other AR device that provides binocular vision to mimic the way humans naturally perceive the world, a left eye display arrangement and a right eye display arrangement can deliver separate images or video streams to each eye. Where an XR device includes multiple displays, steps may be carried out separately and substantially in parallel for each display, in some examples, and pairs of features or components may be included to cater for both eyes.

For example, an XR device captures separate images for a left eye display and a right eye display (or for a set of right eye displays and a set of left eye displays), and renders separate outputs for each eye to create a more immersive experience and to adjust the focus and convergence of the overall view of a user for a more natural, 3D view. Thus, while a single set of display arrangement components is shown in FIG. 5, similar techniques may be applied to cover both eyes by providing a further set of display arrangement components.

Still referring to FIG. 5, the data component 508 can be used to store various data, such as tracking data 538, pose data 540, hand scale data 542, and/or tracker settings 544. User-related data is only stored after approval has been obtained from the user. Furthermore, the tracking data 538, pose data 540, and hand scale data 542 are only temporarily stored (e.g., cached for a particular user session or part thereof) and not persisted to other storage.

The tracking data 538 may include data obtained from one or more of the sensors 502, such as image data from the image sensor 510, eye tracking data from the eye tracking sensor 516, depth maps generated by the XR device 410, or the like. The tracking data 538 can also include data related to the position, velocity, and/or acceleration of a user's hand movements.

In some examples, the tracking data 538 includes "raw" data obtained from the sensors, and the "raw" data is processed by the object tracking component 520 to determine further data, such as landmark data. The landmark data can be processed by the object tracking component 520 to generate the pose data 540. The pose data 540 can include one or more poses as detected by the XR device 410 (e.g., vector data representing respective hand poses).

The hand scale data 542 may include details of various hand scale estimates associated with different hand poses. In some examples, this data is organized as a set of bone length estimates, each corresponding to a specific hand pose. Accordingly, the hand scale data 542 may provide a structured format for temporarily storing and managing hand scale estimates and associated hand poses.

For example, the hand scale data 542 can be stored in a histogram format or other data structure, containing hand pose representations, such as vectors, plane orientations, or other descriptors or identifiers, as well as corresponding hand scale estimates, such as a bone length measurement linked to each hand pose representation. Such a structure can allow for efficient caching and retrieval of scale estimates based on detected hand poses, and efficient updating to add further data.

The tracker settings 544 include configuration parameters for the tracking of objects, including settings relating to scale estimations. In some examples, the tracker settings 544 include rules (e.g., matching threshold) for determining when a new hand pose has been detected, such as a particular angular distance between pose vectors, and for determining that an existing hand pose's scale estimate can be "reused." The tracker settings 544 can further specify parameters for switching between multi-camera and single-camera modes. Additionally, the tracker settings 544 can include settings for a scale calibration process, such as rules for measuring a bone length, rules for determining whether a measurement is viable, or rules for determining when a new bone length estimate has sufficiently "stabilized" or "converged."

One or more of the components described herein may be implemented using hardware (e.g., a processor of a machine) or a combination of hardware and software. For example, a component described herein may configure a processor to perform the operations described herein for that component. Moreover, two or more of these components may be combined into a single component, and the functions described herein for a single component may be subdivided among multiple components. Furthermore, according to various examples, components described herein as being implemented within a single machine, database, component, or device may be distributed across multiple machines, databases, components, or devices.

Figure 6:
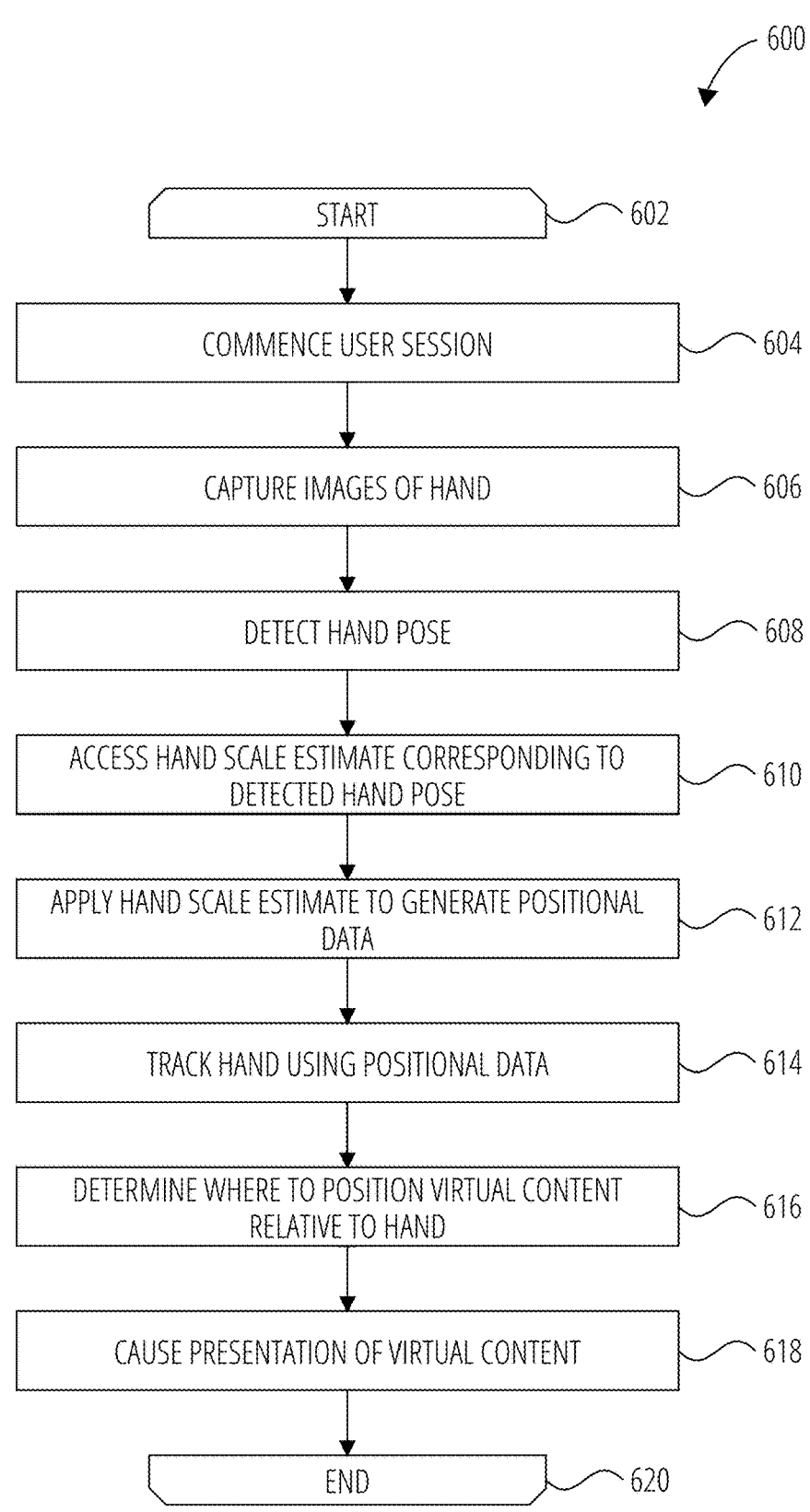
FIG. 6 is a flowchart illustrating operations of a method for obtaining and applying a hand scale estimate to facilitate hand tracking in the context of an XR experience, according to some examples.

FIG. 6 illustrates operations of a method 600 for obtaining and applying a hand scale estimate to facilitate hand tracking in the context of an XR experience, according to some examples. By way of example and not limitation, aspects of the method 600 may be performed by components, devices, systems, or networks shown in FIG. 4 and FIG. 5, and they may accordingly be referenced below.

The method 600 commences at opening loop operation 602 and proceeds to operation 604, where the XR device 410 starts a new user session. For example, the XR device 410 starts a new user session after a user puts on the XR device 410. A "user session" is used herein to refer to an operation of an application during periods of time. For example, where the XR device 410 is a head-wearable device, a user session refers to an operation of the AR application executing on the XR device 410 between the time the user puts on the XR device and the time the user takes off the head-wearable device. In some examples, the user session starts when the XR device is turned on or is woken up from sleep mode and stops when the XR device is turned off or placed in sleep mode. In another example, the user session starts when the user runs or starts the AR application, or runs or starts a particular feature of the AR application, and stops when the user ends the AR application or stops the particular features of the AR application.

During the user session, the XR device 410 detects different hand poses and generates hand scale estimates for the respective hand poses. This information is temporarily cached (e.g., as part of the hand scale data 542) for subsequent use during the user session.

The method 600 proceeds to operation 606, where the XR device 410 captures images of a hand. For example, the XR device 410 uses the image sensor 510 to capture an image of the hand of the user 406 of the XR device 410.

At operation 608, the XR device 410 detects the pose of the hand from the image. The pose of the hand can be detected or determined by processing of the image to generate one or more vectors representing the detected hand pose, with the one or more vectors being based on relative positions of landmarks on the hand. For example, the object tracking component 520 processes the image as follows:

A first machine learning model (e.g., as part of a 2D tracker component) is executed to detect and extract 2D landmarks from the image. This provides the estimated 2D (e.g., (x, y)) positions of the landmarks on the hand relative to the camera (e.g., in camera space). For example, referring to FIG. 1, The 2D landmarks are "lifted" into 3D space using a second machine learning model. The 3D landmarks may be reported in a normalized camera space since scale may be ambiguous from a single camera view. For example, the second machine learning model is trained to process 2D landmark positions and generate normalized 3D position data based on a kinematic model of the hand.

The pose of the hand is detected by the pose detection component 522 based on the (normalized) 3D landmarks. For example, the pose detection component 522 analyzes the relative positions of the landmarks at the base of each finger of the hand 100 of FIG. 1, together with the wrist landmark 106, to determine the pose of the palm of the hand 100, which is deemed to represent the pose of the hand (e.g., a plane best fitting these landmarks is selected to represent the hand pose). The pose of the hand can thus be mathematically represented using one or more vectors, with the aforementioned technique being a non-limiting example.

After detecting the hand pose, the XR device 410 accesses a hand scale estimate corresponding to the detected hand pose at operation 610. For example, the XR device 410 accesses the hand scale data 542 that includes details of previously detected hand poses and their corresponding hand scale estimates.

The XR device 410 selects one of the previously detected hand poses that matches (or sufficiently matches based on a predetermined matching threshold or range) the currently detected hand pose, and applies the corresponding hand scale estimate that was previously generated for the previously detected hand pose. For example, where the hand pose is represented by a plane in 3D space, the XR device 410 compares the orientation of the plane relative to the camera with that of a previously detected hand pose, and determines that the two are the same or sufficiently similar according to a predetermined matching threshold.

The hand scale estimate retrieved from the hand scale data 542 is applied, by the XR device 410, to generate positional data (operation 612). In this context, "generating" positional data may refer to updating or transforming initial positional data generated by the XR device into more useful information. For example, the XR device 410 uses the hand scale estimate to transform the normalized 3D positions referred to above into absolute 3D positions with absolute depth information for the relevant hand landmarks. As mentioned, the hand scale estimate may include an estimated length of a bone in the hand (e.g., a principal bone). The bone length provides information that allows the XR device 410 to generate an absolute depth estimation for each of the landmarks on the hand.

This enables the XR device 410 to track the hand of the user 406 using the positional data, at operation 614, without having to generate a new hand scale estimate. For example, the XR device 410 can track the hand of the user 406 without having to switch from the single-camera mode to the multi-camera mode, because the previous hand scale estimate (that is reused) facilitates hand tracking from a single camera stream. In this way, the XR device 410 can "fall back on" a previously generated hand scale estimate until a "new" pose (e.g., a pose that is significantly different from those for which hand scale estimates are already available) is detected.

At operation 616, the XR device 410 uses the positional data to determine where to position virtual content relative to the hand of the user 406. For example, the XR device 410 determines where to display a virtual apple such that it will appear to be in the palm of the hand in a realistic or immersive manner. The object tracking component 520 can input positional data for a number of image frames into a machine learning model that is trained to predict a future position of the hand. This allows the XR device to align the virtual content with the predicted future position of the hand.

The XR device 410 then renders the virtual content and causes presentation thereof using the display arrangement 506 at operation 618, and the method 600 concludes at closing loop operation 620. It is noted that the relevant poses and their corresponding hand scale estimates are not stored in a persistent manner. Instead, they are temporarily cached in the data component 508 during the user session to allow the XR device 410 to reuse previously generated hand scale estimates, and are removed from memory at the end of the user session.

Figure 7:
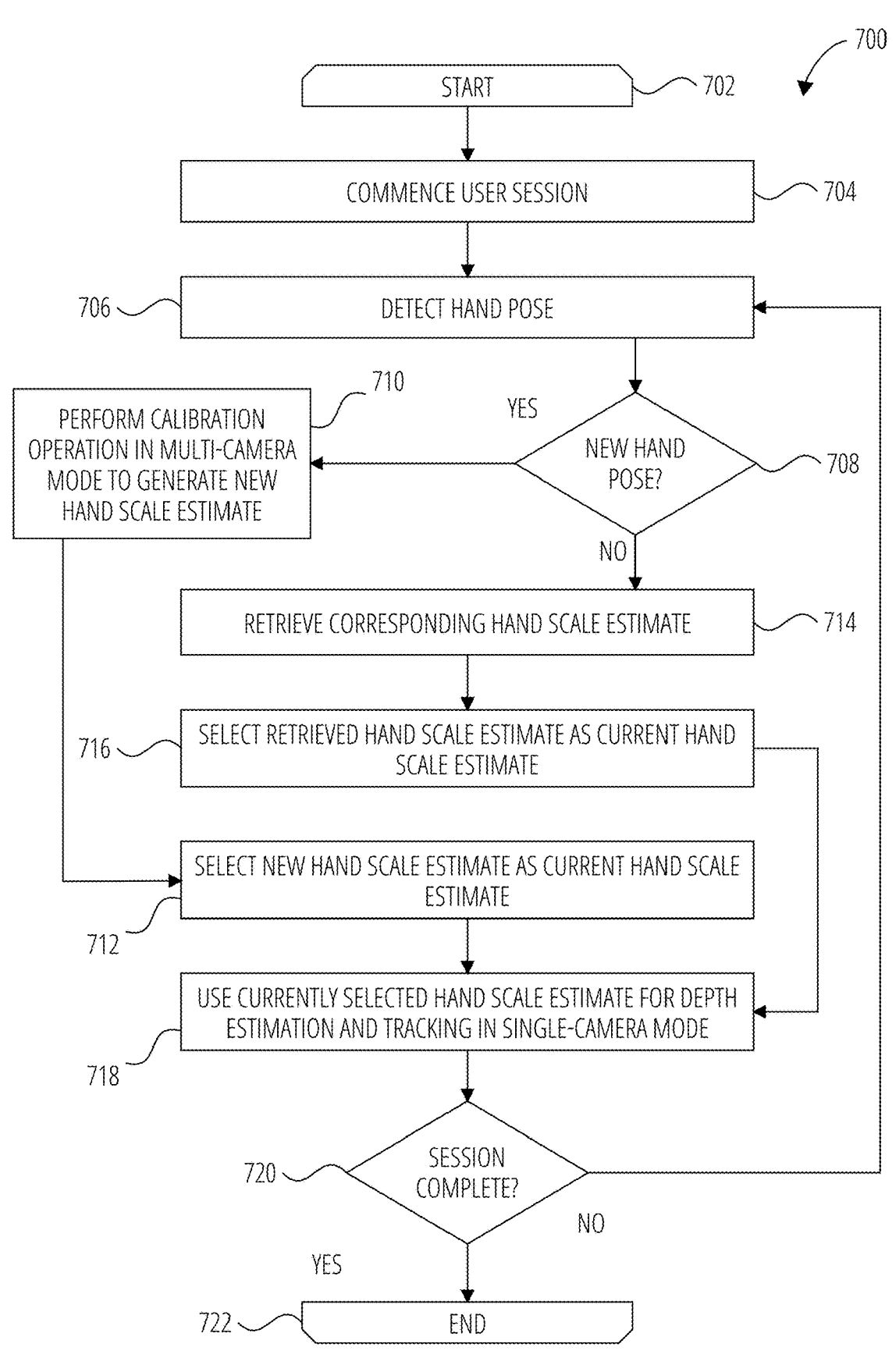
FIG. 7 is a flowchart illustrating operations of a method for obtaining and applying a hand scale estimate to facilitate hand tracking in the context of an XR experience, according to some examples.

FIG. 7 illustrates operations of a method 700 for obtaining and applying a hand scale estimate to facilitate hand tracking in the context of an XR experience, according to some examples. By way of example and not limitation, aspects of the method 700 may be performed by components, devices, systems, or networks shown in FIG. 4 and FIG. 5, and they may accordingly be referenced below.

The method 700 commences at opening loop operation 702 and proceeds to operation 704, where the XR device 410 starts a new user session. For example, the XR device 410 starts a new user session after a user puts on the XR device 410.

The XR device 410 detects a hand pose of a hand within its field of view at operation 706 (e.g., as described with reference to FIG. 6). At decision operation 708, the XR device 410 determines whether the detected hand pose is a "new" hand pose. The XR device 410 maintains, for the user session, a set of existing hand scale estimates with corresponding hand scale estimates (e.g., in the hand scale data 542). The XR device 410 is configured to determine whether the detected hand pose of operation 706 corresponds to any of the respective hand poses associated with existing hand scale estimates in the set of existing hand scale estimates.

In some examples, the tracker settings 544 define a matching threshold for determining whether a detected hand pose corresponds to a previously detected hand pose. For example, if the angular difference between the detected hand pose and one of the cached hand poses corresponding to an existing hand scale estimate is less than 5 degrees or less than 10 degrees, the XR device 410 determines that the detected hand pose matches that existing hand pose.

If there is no match (e.g., in the hand scale data 542), the XR device 410 classifies the detected hand pose as a "new" hand pose in the context of the user session. Where a set of existing hand scale estimates are available, determining that a detected hand pose does not correspond to any of the existing hand scale estimates may thus include determining that the detected hand pose does not meet a matching threshold with respect to any of the respective hand poses associated with the existing hand scale estimates in the set of existing hand scale estimates.

A matching threshold may be based on various factors, such as angular difference/distance between poses or similarity of detected gestures. In some examples, the matching threshold can be set or adjusted by considering tradeoffs between performance/accuracy and power consumption. For example, stricter matching thresholds (e.g., hand poses have to be relatively close in terms of angular distance in order to "match") can result in the XR device 410 running more calibrations to obtain more scale estimates, but this results in longer periods of multi-camera tracking or processing, in turn resulting in higher power consumption. On the other hand, less conservative matching thresholds (e.g., hand poses can be relatively less close to each other in angular distance and still be deemed to "match") can allow the XR device 410 to run fewer calibrations, resulting in longer periods of single-camera tracking or processing, and in turn lower power consumption, but the XR device 410 then has to rely, to a greater extent, on existing scale estimates.

If the detected hand pose is classified as "new," the method 700 proceeds to operation 710, where the XR device 410 performs a calibration operation in the multi-camera mode to generate a new hand scale estimate for the detected hand pose. Example techniques for generating a new hand scale estimate are described with reference to FIG. 8.

In some examples, the XR device 410 adds the new hand scale estimate and its corresponding hand pose to the existing data in the hand scale data 542. Then, at operation 712, the XR device 410 selects the new hand scale estimate as the current hand scale estimate for the hand in its field of view.

On the other hand, if the detected hand pose matches one of the previously detected hand poses, the method 700 proceeds from decision operation 708 to operation 714, where the XR device 410 retrieves the existing hand scale estimate. In other words, no calibration operation is performed. At operation 716, the XR device 410 selects the retrieved hand scale estimate as the current hand scale estimate for the hand in its field of view.

Irrespective of whether a calibration operation was performed with respect to the hand pose detected at operation 706, at operation 718, the XR device 410 uses the currently selected hand scale estimate to track the hand in the single-camera mode. The hand scale estimate allows the XR device 410 to obtain positional information for the hand, including one or more depth estimations relative to the camera.

If the user session ends, the method 700 proceeds from operation 718 to decision operation 720, and then concludes at closing loop operation 722. If the user session continues, the method 700 proceeds from operation 718 to decision operation 720, and then back to operation 706 where the XR device 410 detects a further hand pose and continues to decision operation 708, as described above.

In some examples, while the calibration process of operation 710 is in progress (e.g., while the new hand scale estimate is converging or stabilizing), the XR device 410 uses another hand scale estimate for hand tracking in the interim period. For example, the XR device 410 automatically falls back to an existing hand scale estimate associated with the closest previously detected pose relative to the new pose detected at operation 706 (even though the closest pose does not sufficiently match the new pose). Thus, the method 700 may include identifying, from among the respective hand poses associated with existing hand scale estimates (e.g., in the hand scale data 542), an existing hand pose that is closest to the detected hand pose, and using the existing hand scale estimate associated with the closest existing hand pose to facilitate the tracking of the hand while the calibration operation is in progress. Once the new hand scale estimate is ready, the XR device 410 then starts using the new hand scale estimate for the tracking of the hand.

Figure 8:
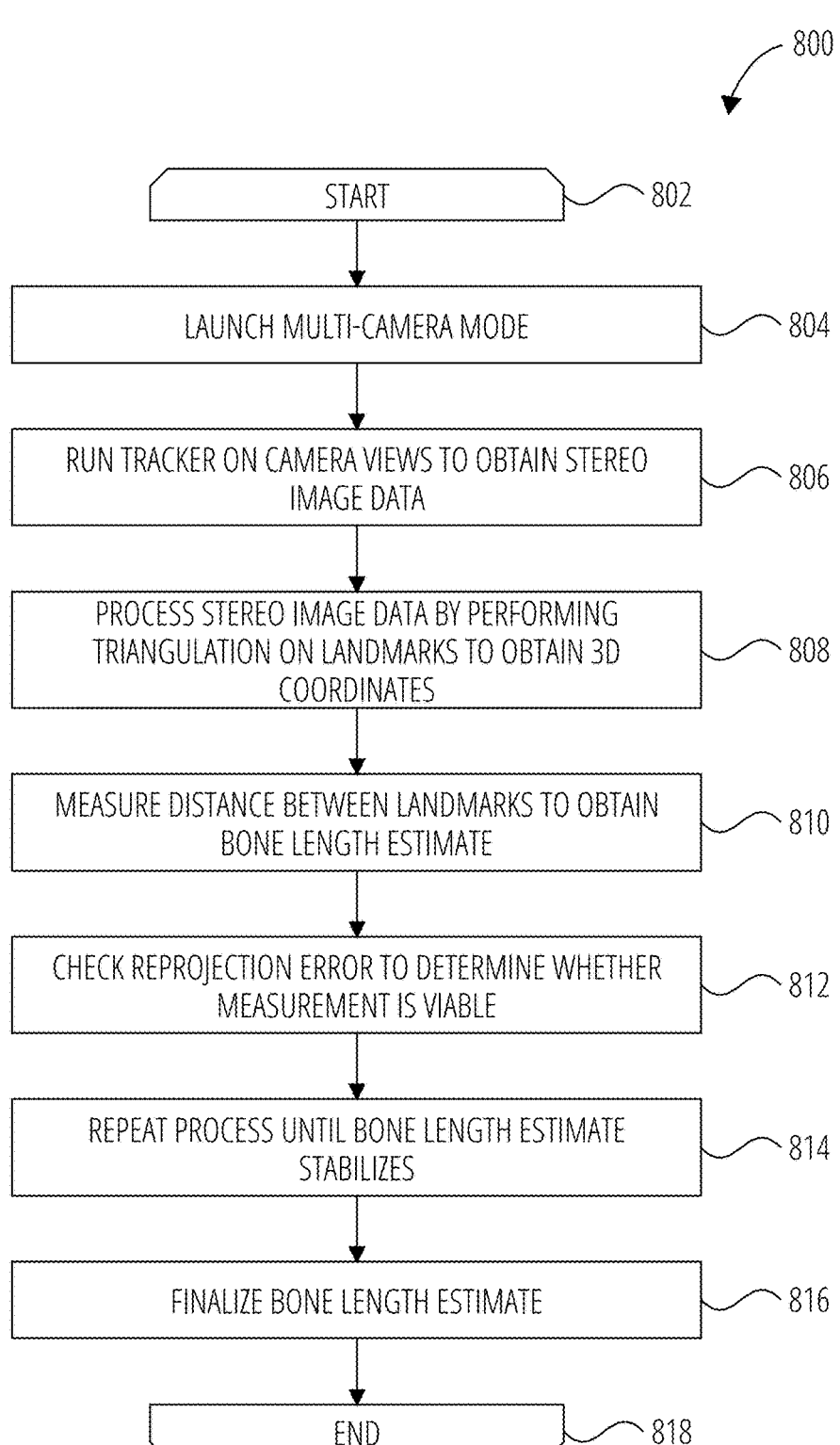
FIG. 8 is a flowchart illustrating operations of a method for generating a hand scale estimate, according to some examples.

FIG. 8 illustrates operations of a method 800 for generating a hand scale estimate, according to some examples. By way of example and not limitation, aspects of the method 800 may be performed by components, devices, systems, or networks shown in FIG. 4 and FIG. 5, and they may accordingly be referenced below.

The method 800 commences at opening loop operation 802 and proceeds to operation 804, where the XR device 410 launches the multi-camera mode for a calibration operation. For example, the multi-camera mode can be launched by the control system 526 of the XR device 410 in response to determining that a new hand scale estimate is needed for a "new" detected pose (e.g., as described with reference to FIG. 7).

In some examples, the method 800 includes preliminary operations that are performed by the XR device 410 prior to commencing generation of a new hand scale estimate. For example, the XR device 410 determines whether the hand is fully within the overlapping field of view of the cameras of the XR device 410 and only proceeds if this condition is met.

The operations of FIG. 8 are described with reference to an XR device 410 that includes two cameras (e.g., two of the image sensors 510) that capture objects from different perspectives, enabling it to capture and process stereo image data. However, it will be appreciated that, in other examples, the XR device 410 can include more than two cameras (e.g., 4 cameras) that are used in the multi-camera mode.

Furthermore, in the operations of FIG. 8, the hand scale estimate includes a single bone length estimate, such as an estimate of the length of the index finger metacarpal bone that is used to represent the overall scale of the hand. However, it will be appreciated that other types or combinations of hand scale estimates can be generated using techniques similar to those of FIG. 8. For example, a hand scale estimate can consist of an average of multiple bone lengths, or can be defined by a set of multiple bone lengths (e.g., a bone length for the index finger metacarpal bone as well as a bone length for the middle finger metacarpal bone).

At operation 806, the XR device 410 runs a tracker (e.g., via the object tracking component 520) on both camera views to obtain the stereo image data referred to above. Alternatively, if the XR device 410 has already run the tracker on one of the camera views while it operated in the single-camera mode, it proceeds to run the tracker on the second camera view in operation 806. The stereo image data may include visual information captured simultaneously by two cameras of the XR device 410, providing multiple viewpoints of the hand. For example, referring to FIG. 1, the XR device 410 obtains (x, y) coordinates for the landmarks 102 of the hand 100 from two different camera views (taken at the same point in time).

In some examples, the XR device 410 continuously captures images with both cameras (even in the single-camera mode), but only processes the images of one camera in the single-camera mode, while the images from both cameras are processed when the XR device 410 operates in the multi-camera mode.

At operation 808, the scale estimation component 524 of the XR device 410 processes the stereo image data (e.g., including at least 2D landmark positions from both camera perspectives) and performs triangulation to determine the 3D coordinates of the landmarks. The stereo image data may include visual information captured simultaneously by two cameras of the XR device 410, providing multiple viewpoints of the hand.

It is noted that triangulation is possible when the relevant parameters of the cameras are known (e.g., from factory calibration). The stereo image data can include synchronized images from two cameras with known relative positions and orientations, as well as other relevant parameters. The relevant parameters are often referred to as the "intrinsics" and "extrinsics." In this context, camera extrinsic parameters can include, for example, relative transformations between the cameras, and camera intrinsic parameters can include, for example, focal length or principal point. Lens distortion parameters may also be known and applied in this regard.

At operation 810, the scale estimation component 524 of the XR device 410 measures the distance between the relevant landmarks to obtain the bone length estimate that is used as the hand scale estimate. For example, referring to FIG. 1, the scale estimation component 524 measures the distance between a 3D coordinate of the wrist landmark 106 and a 3D coordinate of the index finger knuckle joint landmark 108 to obtain an estimate for the principal bone length 104.

In some examples, and as shown at operation 812, the XR device 410 checks the reprojection error to determine whether the measurement is viable, and only uses a particular measurement if the reprojection error is sufficiently small (e.g., the error is within a predetermined margin of error). The checking of the reprojection error may include assessing the accuracy of the 3D reconstruction of the landmarks by projecting the calculated 3D points back onto the 2D image planes of the relevant cameras and comparing them to the original 2D points.

As shown at operation 814, the process of obtaining a measurement for the bone length can be repeated (e.g., across multiple frames) until the bone length estimate stabilizes, or converges. A predetermined stabilization threshold can be used to determine whether the bone length estimate has stabilized sufficiently. The predetermined stabilization threshold can include, for example, a criterion to determine when a series of measurements has converged to a stable value during the calibration operation. For example, the XR device 410 generates multiple different measurements for the index finger metacarpal bone, and if the difference between consecutive measurements falls below a certain percentage (e.g., less than 1% change or less than 3% change) for a specified number of iterations (e.g., three consecutive measurements), the XR device 410 considers the measurement to have met the predetermined stabilization threshold.

The method 800 proceeds to operation 816, where the bone length estimate is finalized. For example, the XR device 410 finalizes the calibration operation by selecting a bone length estimate that has been determined to satisfy the predetermined stabilization threshold. Once finalized, the XR device 410 may temporarily store (e.g., cache) the bone length estimate so that it can be applied subsequently during a user session. The method 800 concludes at closing loop operation 818.

As mentioned, once the calibration operation is completed, the XR device 410 can automatically switch back to the single-camera mode. In the single-camera mode, the XR device 410 uses the newly generated hand scale estimate to obtain accurate 3D positional information for the hand, such as to infer 3D landmarks with absolute depth information based on an initial set of positional data with relative depth information. In some examples, and referring again to FIG. 1, the XR device 410 uses the principal bone length 104 together with new 2D positional data of the hand, obtained from a single camera view in subsequent image frames, to generate 3D positional data of the hand for those frames.

Figure 9:
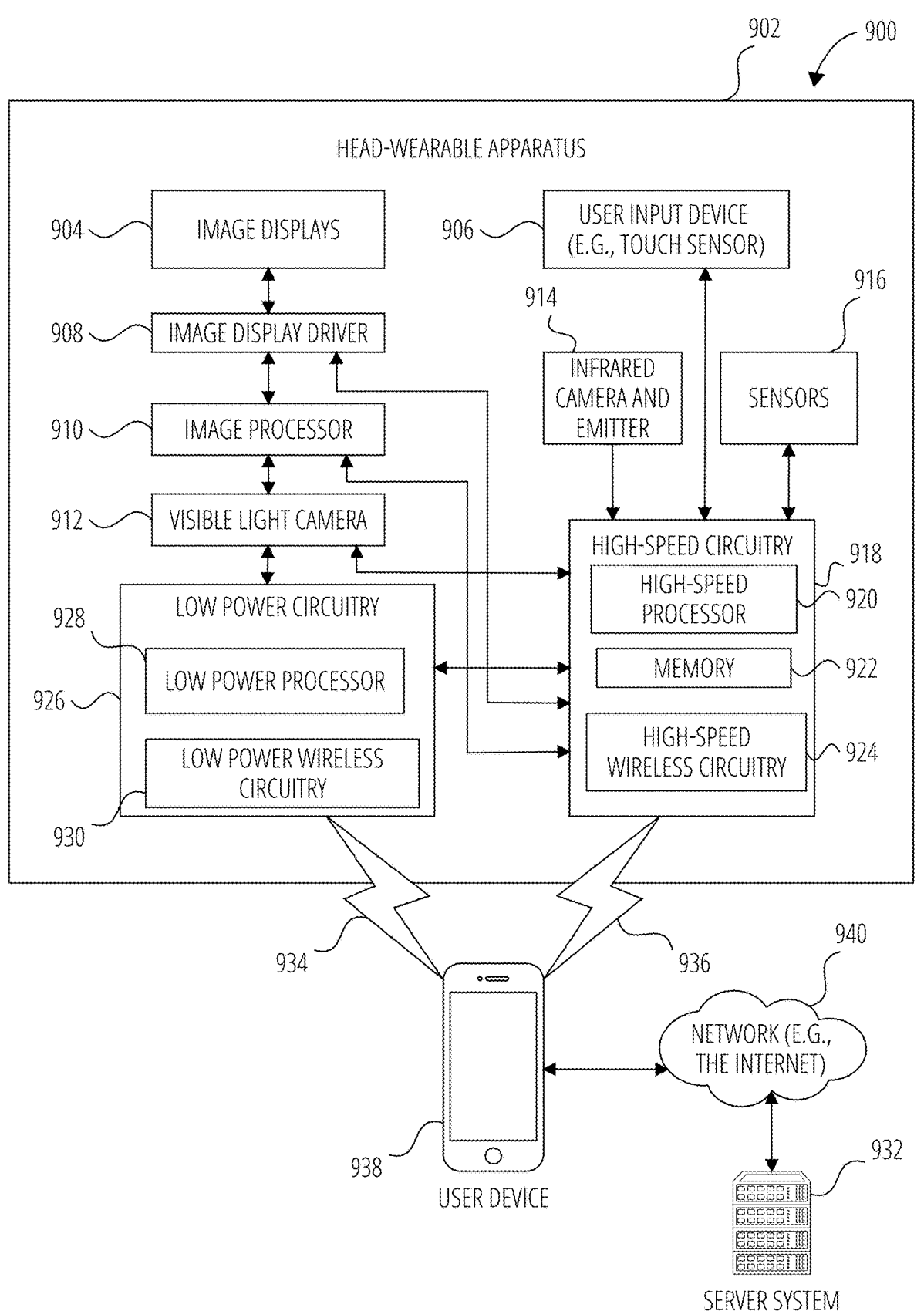
FIG. 9 illustrates a network environment in which a head-wearable apparatus can be implemented, according to some examples.

FIG. 9 illustrates a network environment 900 in which a head-wearable apparatus 902, such as a head-wearable XR device, can be implemented according to some examples. FIG. 9 provides a high-level functional block diagram of an example head-wearable apparatus 902 communicatively coupled to a mobile user device 938 and a server system 932 via a suitable network 940. One or more of the techniques described herein may be performed using the head-wearable apparatus 902 or a network of devices similar to those shown in FIG. 9.

The head-wearable apparatus 902 includes a camera, such as at least one of a visible light camera 912 and an infrared camera and emitter 914 (or multiple cameras). The head-wearable apparatus 902 includes other sensors 916, such as motion sensors or eye tracking sensors. The user device 938 can be capable of connecting with head-wearable apparatus 902 using both a communication link 934 and a communication link 936. The user device 938 is connected to the server system 932 via the network 940. The network 940 may include any combination of wired and wireless connections.

The head-wearable apparatus 902 includes a display arrangement that has several components. For example, the arrangement includes two image displays 904 of an optical assembly. The two displays include one associated with the left lateral side and one associated with the right lateral side of the head-wearable apparatus 902. The head-wearable apparatus 902 also includes an image display driver 908, an image processor 910, low power circuitry 926, and high-speed circuitry 918. The image displays 904 are for presenting images and videos, including an image that can provide a graphical user interface to a user of the head-wearable apparatus 902.

The image display driver 908 commands and controls the image display of each of the image displays 904. The image display driver 908 may deliver image data directly to each image display of the image displays 904 for presentation or may have to convert the image data into a signal or data format suitable for delivery to each image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 902 may include a frame and stems (or temples) extending from a lateral side of the frame, or another component to facilitate wearing of the head-wearable apparatus 902 by a user. The head-wearable apparatus 902 of FIG. 9 further includes a user input device 906 (e.g., touch sensor or push button) including an input surface on the head-wearable apparatus 902. The user input device 906 is configured to receive, from the user, an input selection to manipulate the graphical user interface of the presented image.

The components shown in FIG. 9 for the head-wearable apparatus 902 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 902. Left and right sides of the head-wearable apparatus 902 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. The memory 922 can also include a storage device. As further shown in FIG. 9, the high-speed circuitry 918 includes a high-speed processor 920, the memory 922, and high-speed wireless circuitry 924. In FIG. 9, the image display driver 908 is coupled to the high-speed circuitry 918 and operated by the high-speed processor 920 in order to drive the left and right image displays of the image displays 904. The high-speed processor 920 may be any processor capable of managing high-speed communications and operation of any general computing system needed for the head-wearable apparatus 902. The high-speed processor 920 includes processing resources needed for managing high-speed data transfers over the communication link 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi™. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or Wi-Fi™). The user device 938, including the transceivers communicating via the communication link 934 and communication link 936, may be implemented using details of the architecture of the head-wearable apparatus 902, as can other elements of the network 940.

The memory 922 includes any storage device capable of storing various data and applications, including, among other things, camera data generated by the visible light camera 912, sensors 916, and the image processor 910, as well as images generated for display by the image display driver 908 on the image displays 904. While the memory 922 is shown as integrated with the high-speed circuitry 918, in other examples, the memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (e.g., visible light camera 912, or infrared camera and emitter 914), the image display driver 908, the user input device 906 (e.g., touch sensor or push button), and the memory 922. The head-wearable apparatus 902 also includes sensors 916, which may be the motion components 1534, position components 1538, environmental components 1536, or biometric components 1532, e.g., as described below with reference to FIG. 15. In particular, motion components 1534 and position components 1538 are used by the head-wearable apparatus 902 to determine and keep track of the position and orientation of the head-wearable apparatus 902 relative to a frame of reference or another object, in conjunction with a video feed from one of the visible light cameras 912, using for example techniques such as structure from motion (SfM) or VIO.

In some examples, and as shown in FIG. 9, the head-wearable apparatus 902 is connected with a host computer. For example, the head-wearable apparatus 902 is paired with the user device 938 via the communication link 936 or connected to the server system 932 via the network 940. The server system 932 may be one or more computing devices as part of a service or network computing system, for example, that include a processor, a memory, and network communication interface to communicate over the network 940 with the user device 938 and head-wearable apparatus 902.

The user device 938 includes a processor and a network communication interface coupled to the processor. The network communication interface allows for communication over the network 940, communication link 934 or communication link 936. The user device 938 can further store at least portions of the instructions for implementing functionality described herein.

Output components of the head-wearable apparatus 902 include visual components, such as a display (e.g., one or more liquid-crystal display (LCD)), one or more plasma display panel (PDP), one or more light emitting diode (LED) display, one or more projector, or one or more waveguide. The image displays 904 of the optical assembly are driven by the image display driver 908. The output components of the head-wearable apparatus 902 may further include acoustic components (e.g., speakers), haptic components (e.g., a vibratory motor), other signal generators, and so forth. The input components of the head-wearable apparatus 902, the user device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with the head-wearable apparatus 902. For example, peripheral device elements may include any input/output (I/O) components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 936 from the user device 938 via the low power wireless circuitry 930 or high-speed wireless circuitry 924.

Any biometric data collected by biometric components is captured and stored only after explicit user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Figure 10:
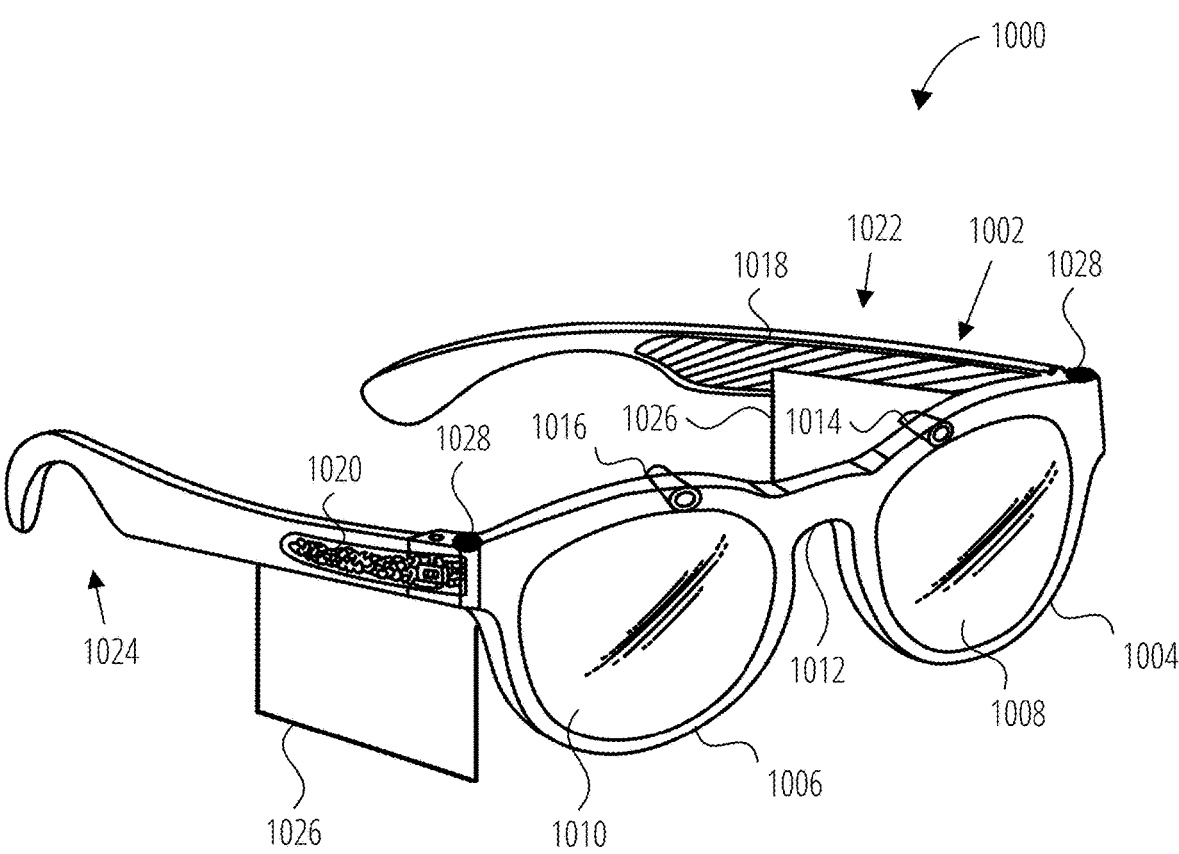
FIG. 10 is a perspective view of a head-worn device, in accordance with some examples.

FIG. 10 is a perspective view of a head-worn XR device in the form of glasses 1000, according to some examples. The glasses 1000 can include a frame 1002 made from any suitable material such as plastic or metal, including any suitable shape memory alloy. In one or more examples, the frame 1002 includes a first or left optical element holder 1004 (e.g., a display or lens holder) and a second or right optical element holder 1006 connected by a bridge 1012. A first or left optical element 1008 and a second or right optical element 1010 can be provided within respective left optical element holder 1004 and right optical element holder 1006. The right optical element 1010 and the left optical element 1008 can be a lens, a display, a display assembly, or a combination of the foregoing. Any suitable display assembly can be provided in the glasses 1000.

The frame 1002 additionally includes a left arm or temple piece 1022 and a right arm or temple piece 1024. In some examples the frame 1002 can be formed from a single piece of material so as to have a unitary or integral construction.

The glasses 1000 can include a computing device, such as a computer 1020, which can be of any suitable type so as to be carried by the frame 1002 and, in one or more examples, of a suitable size and shape, so as to be partially disposed in one of the temple piece 1022 or the temple piece 1024. The computer 1020 can include one or more processors with memory, wireless communication circuitry, and a power source. The computer 1020 may comprise low-power circuitry, high-speed circuitry, and a display processor. Various other examples may include these elements in different configurations or integrated together in different ways.

The computer 1020 additionally includes a battery 1018 or other suitable portable power supply. In some examples, the battery 1018 is disposed in left temple piece 1022 and is electrically coupled to the computer 1020 disposed in the right temple piece 1024. The glasses 1000 can include a connector or port (not shown) suitable for charging the battery 1018, a wireless receiver, transmitter or transceiver (not shown), or a combination of such devices.

The glasses 1000 include a first or left camera 1014 and a second or right camera 1016. Although two cameras are depicted, other examples contemplate the use of a single or additional (i.e., more than two) cameras. In one or more examples, the glasses 1000 include any number of input sensors or other input/output devices in addition to the left camera 1014 and the right camera 1016. Such sensors or input/output devices can additionally include biometric sensors, location sensors, motion sensors, and so forth.

In some examples, the left camera 1014 and the right camera 1016 provide video frame data for use by the glasses 1000 to extract 3D information (for example) from a real world scene. The glasses 1000 may also include a touchpad 1026 mounted to or integrated with one or both of the left temple piece 1022 and right temple piece 1024. The touchpad 1026 is generally vertically-arranged, approximately parallel to a user's temple in some examples. As used herein, generally vertically aligned means that the touchpad is more vertical than horizontal, although potentially more vertical than that. Additional user input may be provided by one or more buttons 1028, which in the illustrated examples are provided on the outer upper edges of the left optical element holder 1004 and right optical element holder 1006. The one or more touchpads 1026 and buttons 1028 provide a means whereby the glasses 1000 can receive input from a user of the glasses 1000.

Figure 11:
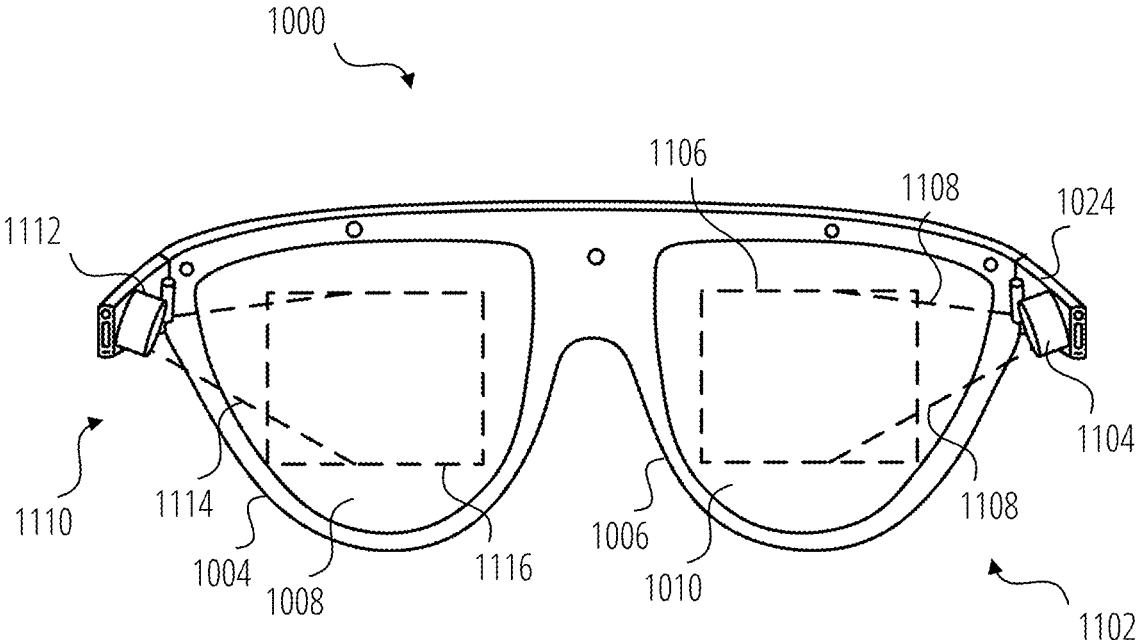
FIG. 11 illustrates a further view of the head-worn device of FIG. 10, in accordance with some examples.

FIG. 11 illustrates the glasses 1000 from the perspective of a user. For clarity, a number of the elements shown in FIG. 10 have been omitted. As described with reference to FIG. 10, the glasses 1000 shown in FIG. 11 include left optical element 1008 and right optical element 1010 secured within the left optical element holder 1004 and the right optical element holder 1006 respectively.

The glasses 1000 include forward optical assembly 1102 comprising a right projector 1104 and a right near eye display 1106, and a forward optical assembly 1110 including a left projector 1112 and a left near eye display 1116.

In some examples, the near eye displays are waveguides. The waveguides include reflective or diffractive structures (e.g., gratings and/or optical elements such as mirrors, lenses, or prisms). Light 1108 emitted by the projector 1104 encounters the diffractive structures of the waveguide of the near eye display 1106, which directs the light towards the right eye of a user to provide an image on or in the right optical element 1010 that overlays the view of the real world seen by the user. Similarly, light 1114 emitted by the projector 1112 encounters the diffractive structures of the waveguide of the near eye display 1116, which directs the light towards the left eye of a user to provide an image on or in the left optical element 1008 that overlays the view of the real world seen by the user.

In some examples, the combination of a graphics processing unit (GPU), the forward optical assembly 1102, the left optical element 1008, and the right optical element 1010 provide an optical engine of the glasses 1000. The glasses 1000 use the optical engine to generate an overlay of the real world view of the user including display of a 3D user interface to the user of the glasses 1000.

It will be appreciated however that other display technologies or configurations may be utilized within an optical engine to display an image to a user in the user's field of view. For example, instead of a projector 1104 and a waveguide, an LCD, LED or other display panel or surface may be provided.

In use, a user of the glasses 1000 will be presented with information, content, and various 3D user interfaces on the near eye displays. As described in more detail herein, the user can then interact with the glasses 1000 using a touchpad 1026 and/or the buttons 1028, voice inputs or touch inputs on an associated device, and/or hand movements, locations, and positions detected by the glasses 1000.

Figure 12:
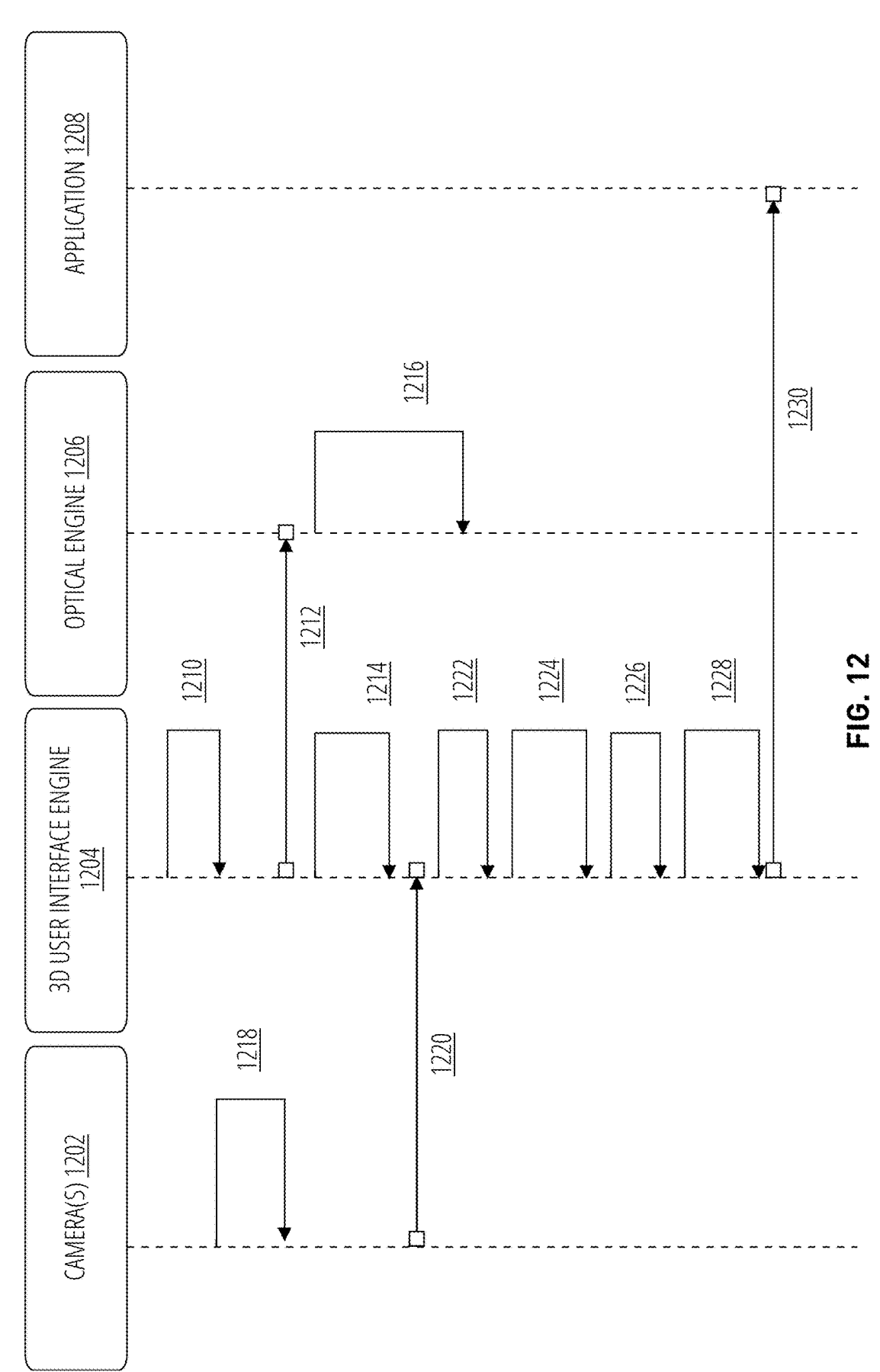
FIG. 12 illustrates a three-dimensional (3D) user interface generation and utilization process in accordance with some examples.
Figure 13:
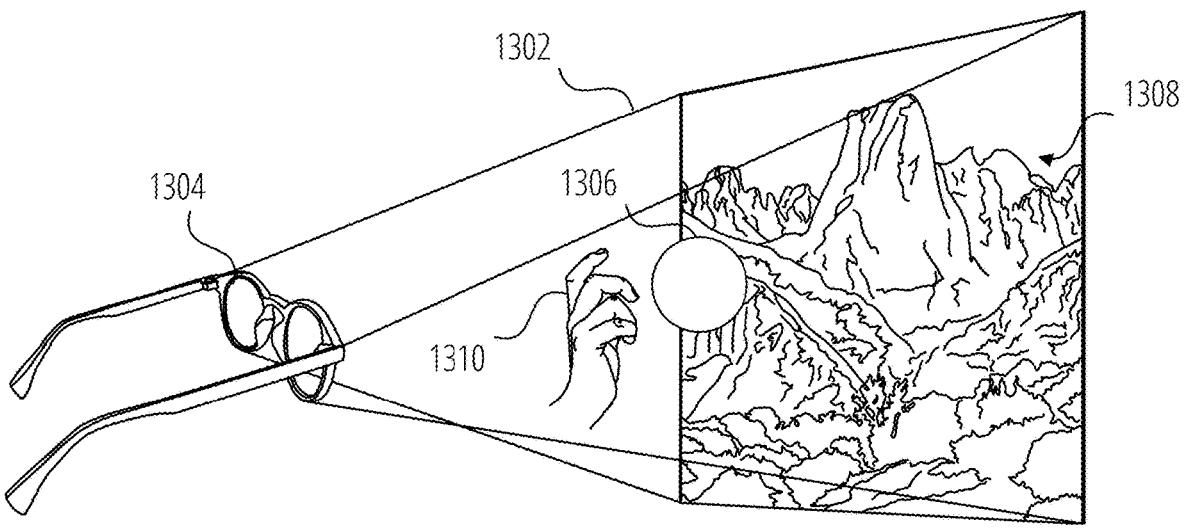
FIG. 13 illustrates a 3D user interface in accordance with some examples.

Referring now to FIG. 12 and FIG. 13, FIG. 12 depicts a sequence diagram of an example 3D user interface process and FIG. 13 depicts a 3D user interface 1302 of glasses 1304 in accordance with some examples. During the process, a 3D user interface engine 1204 generates 1210 the 3D user interface 1302 including one or more virtual objects 1306 that constitute interactive elements of the 3D user interface 1302.

A virtual object may be described as a solid in a 3D geometry having values in 3-tuples of X (horizontal), Y (vertical), and Z (depth). A 3D render of the 3D user interface 1302 is generated and 3D render data 1212 is communicated to an optical engine 1206 of the glasses 1304 and displayed 1216 to a user of the glasses 1304. The 3D user interface engine 1204 generates 1214 one or more virtual object colliders for the one or more virtual objects. One or more camera(s) 1202 of the glasses 1304 generate 1218 real world video frame data 1220 of the real world 1308 as viewed by the user of the glasses 1304.

Included in the real world video frame data 1220 is hand position video frame data of one or more of the user's hands 1310 from a viewpoint of the user while wearing the glasses 1304 and viewing the projection of the 3D render of the 3D user interface 1302 by the optical engine 1206. Thus the real world video frame data 1220 include hand location video frame data and hand position video frame data of the user's hands 1310 as the user makes movements with their hands.

The 3D user interface engine 1204 or other components of the glasses 1304 utilize the hand location video frame data and hand position video frame data in the real world video frame data 1220 to extract landmarks 1222 of the user's hands 1310 from the real world video frame data 1220 and generates 1224 landmark colliders for one or more landmarks on one or more of the user's hands 1310.

The landmark colliders are used to determine user interactions between the user and the virtual object by detecting collisions 1226 between the landmark colliders and respective visual object colliders of the virtual objects. The collisions are used by the 3D user interface engine 1204 to determine user interactions 1228 by the user with the virtual objects. The 3D user interface engine 1204 communicates user interaction data 1230 of the user interactions to an application 1208 for utilization by the application 1208.

In some examples, the application 1208 performs the functions of the 3D user interface engine 1204 by utilizing various Application Programming Interfaces (APIs) and system libraries to receive and process the real world video frame data 1220 and instruct the optical engine 1206.

In some examples, a user wears one or more sensor gloves or other sensors on the user's hands that generate sensed hand position data and sensed hand location data that is used to generate the landmark colliders. The sensed hand position data and sensed hand location data are communicated to the 3D user interface engine 1204 and used by the 3D user interface engine 1204 in lieu of or in combination with the hand location video frame data and hand position video frame data to generate landmark colliders for one or more landmarks on one or more of the user's hands 1310.

Figure 14:
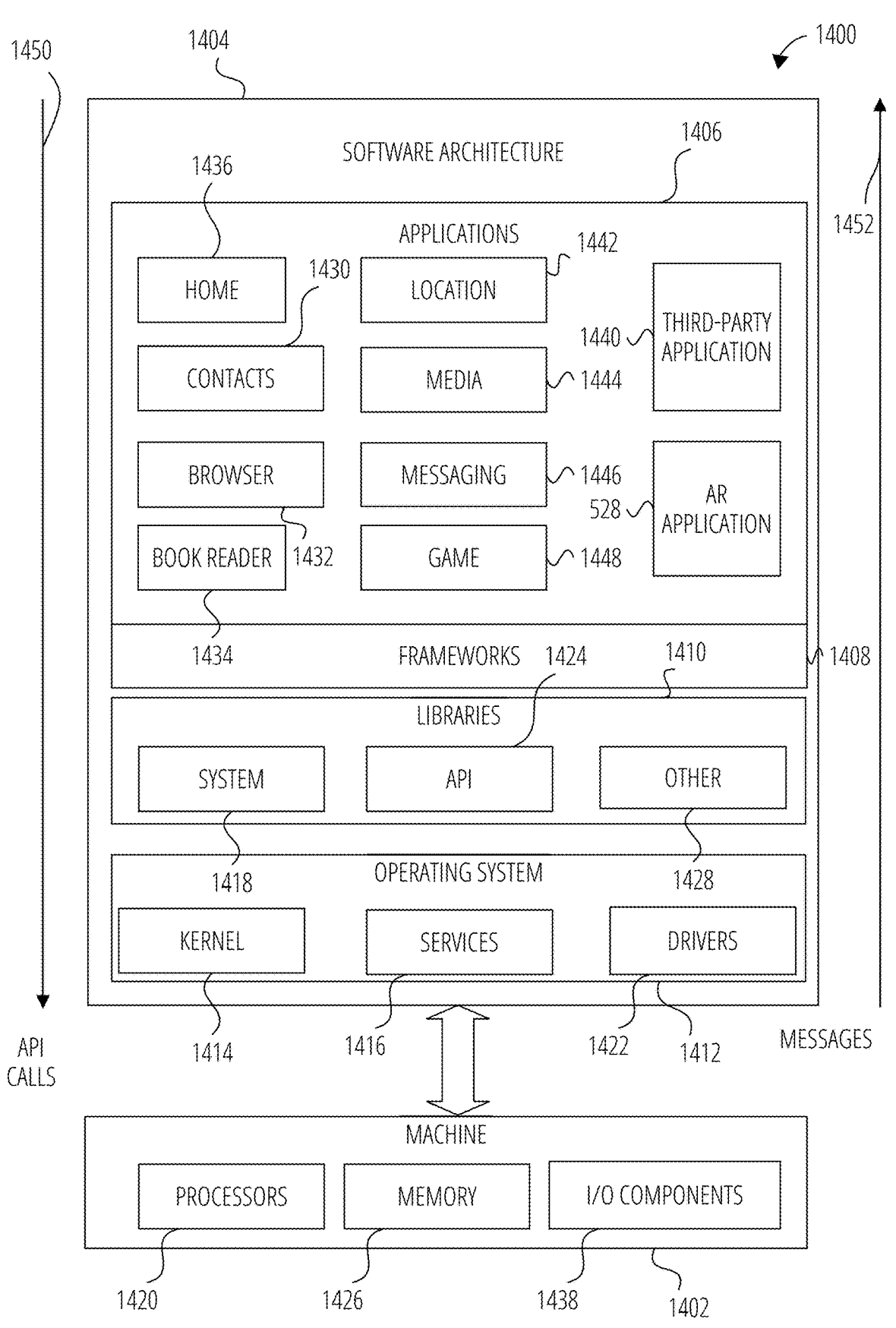
FIG. 14 is a block diagram showing a software architecture within which the present disclosure may be implemented, according to some examples.

FIG. 14 is a block diagram 1400 illustrating a software architecture 1404, which can be installed on one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450, through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1410 provide a low-level common infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a high-level common infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In some examples, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In some examples, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 14, the third-party application 1440 can invoke the API calls 1450 provided by the operating system 1412 to facilitate functionality described herein. The applications 1406 may include an AR application such as the AR application 528 described herein, according to some examples.

Figure 15:
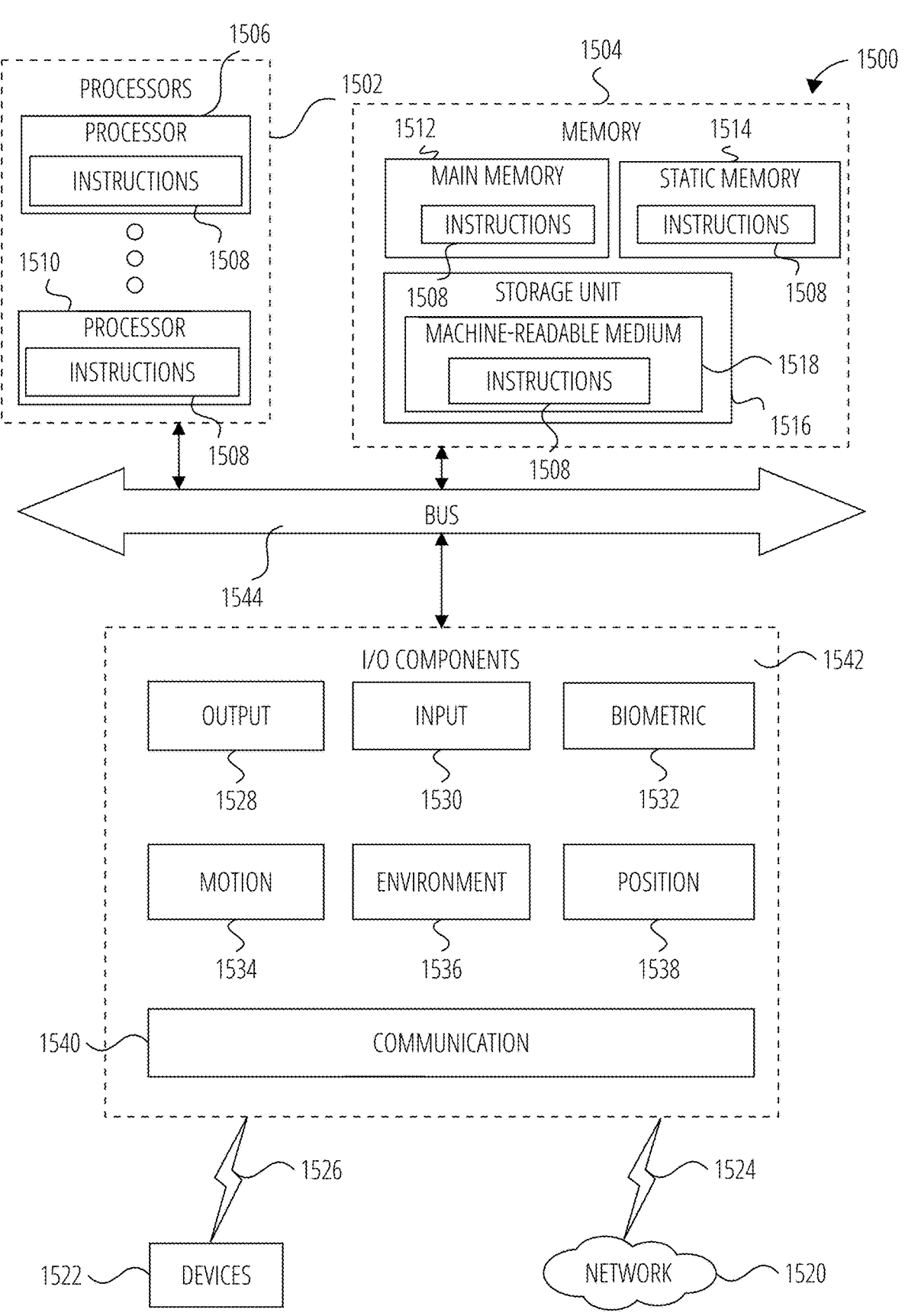
FIG. 15 is a diagrammatic representation of a machine in the form of a computer system within which a set of instructions may be executed for causing the machine to perform any one or more of the methodologies discussed herein, according to some examples.

FIG. 15 is a diagrammatic representation of a machine 1500 within which instructions 1508 (e.g., software, a program, an application, an applet, or other executable code) for causing the machine 1500 to perform one or more of the methodologies discussed herein may be executed. For example, the instructions 1508 may cause the machine 1500 to execute any one or more of the methods described herein.

The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include processors 1502, memory 1504, and I/O components 1542, which may be configured to communicate with each other via a bus 1544. In some examples, the processors 1502 may include, for example, a processor 1506 and a processor 1510 that execute the instructions 1508. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, accessible to the processors via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors, or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various examples, the I/O components 1542 may include output components 1528 and input components 1530.

The output components 1528 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver components), altitude sensor components (e.g., altimeters or barometers that detect air pressure from which altitude may be derived), orientation sensor components (e.g., magnetometers), and the like.

As mentioned, any biometric data collected by biometric components is captured and stored only after explicit user approval and deleted on user request. Further, such biometric data is used for very limited purposes, such as identification verification. To ensure limited and authorized use of biometric information and other PII, access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth™ components, Wi-Fi™ components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi™ signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed examples.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this disclosure, refer to this disclosure as a whole and not to any particular portions of this disclosure. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method comprising: capturing, via one or more optical sensors of an XR device, at least one image of a hand of a user of the XR device; processing the at least one image to detect a hand pose relative to the XR device; accessing a hand scale estimate corresponding to the detected hand pose, the hand scale estimate being one of a plurality of hand scale estimates each uniquely associated with a respective hand pose; applying the hand scale estimate to generate positional data for one or more features of the hand of the user; and tracking, by the XR device and based on the positional data, the hand of the user while the user is using the XR device.

In Example 2, the subject matter of Example 1 includes, wherein the detected hand pose is a first hand pose, the hand scale estimate is a first hand scale estimate, and the method further comprises: after detecting the first hand pose, detecting that the hand of the user has assumed a second hand pose that differs from the first hand pose; determining that the second hand pose corresponds to one of the respective hand poses associated with the plurality of hand scale estimates; accessing a second hand scale estimate associated with the corresponding one of the respective hand poses, the second hand scale estimate being one of the plurality of hand scale estimates, and the second hand scale estimate differing from the first hand scale estimate; applying the second hand scale estimate to generate further positional data for the one or more features of the hand of the user; and further tracking the hand of the user based on the further positional data.

In Example 3, the subject matter of any of Examples 1-2 includes, wherein the plurality of hand scale estimates comprises a set of existing hand scale estimates, and the method further comprises generating the hand scale estimate by: determining that the detected hand pose does not correspond to any of the existing hand scale estimates in the set of existing hand scale estimates; and in response to determining that the detected hand pose does not correspond to any of the existing hand scale estimates: triggering commencement of a calibration operation to obtain the hand scale estimate; associating the hand scale estimate with the detected hand pose; and updating the plurality of hand scale estimates by adding the hand scale estimate to the set of existing hand scale estimates.

In Example 4, the subject matter of Example 3 includes, wherein the one or more optical sensors comprise a plurality of cameras, and the calibration operation is performed in a multi-camera mode.

In Example 5, the subject matter of Example 4 includes, wherein the tracking of the hand is performed in a single-camera mode, and the method further comprises: automatically switching from the multi-camera mode to the single-camera mode after the generating of the hand scale estimate.

In Example 6, the subject matter of any of Examples 3-5 includes, wherein the determining that the detected hand pose does not correspond to any of the existing hand scale estimates comprises determining that the detected hand pose does not meet a matching threshold with respect to any of the respective hand poses associated with the existing hand scale estimates in the set of existing hand scale estimates.

In Example 7, the subject matter of any of Examples 3-6 includes, identifying, from among the respective hand poses associated with the existing hand scale estimates in the set of existing hand scale estimates, an existing hand pose that is closest to the detected hand pose, the existing hand pose being uniquely associated with an existing hand scale estimate in the set of existing hand scale estimates; and using the existing hand scale estimate associated with the existing hand pose to facilitate the tracking of the hand while the calibration operation is in progress.

In Example 8, the subject matter of any of Examples 1-7 includes, wherein the positional data comprises 3D positions related to one or more landmarks on the hand that are tracked by the XR device.

In Example 9, the subject matter of Example 8 includes, wherein the positional data comprises absolute depth information related to the one or more landmarks, the applying of the hand scale estimate to generate the positional data comprising: applying the hand scale estimate to obtain the absolute depth information from relative depth information related to the one or more landmarks.

In Example 10, the subject matter of Example 9 includes, before obtaining the absolute depth information: executing a neural network to generate the relative depth information based on 2D positions related to the one or more landmarks.

In Example 11, the subject matter of any of Examples 1-10 includes, wherein the hand scale estimate comprises at least one bone length estimate associated with the hand.

In Example 12, the subject matter of Example 11 includes, wherein the hand scale estimate is generated in a multi-camera mode by a calibration operation comprising: accessing stereo image data for the hand; processing the stereo image data by performing triangulation on landmarks on the hand; and measuring one or more distances between at least some of the landmarks on the hand to determine the at least one bone length estimate.

In Example 13, the subject matter of Example 12 includes, repeating the calibration operation until the at least one bone length estimate meets a predetermined stabilization threshold.

In Example 14, the subject matter of any of Examples 1-13 includes, wherein the tracking of the hand comprises providing, by the XR device, the positional data as input to a machine learning model that is executed to track the hand.

In Example 15, the subject matter of any of Examples 1-14 includes, wherein the processing of the at least one image comprises generating one or more vectors representing the detected hand pose, the one or more vectors being generated based on relative positions of landmarks on the hand.

In Example 16, the subject matter of any of Examples 1-15 includes, wherein each of the respective hand poses is represented by one or more respective vectors.

In Example 17, the subject matter of any of Examples 1-16 includes, generating, by the XR device, virtual content; determining positioning of the virtual content relative to the hand of the user based on the positional data; and causing presentation of the virtual content to the user.

In Example 18, the subject matter of any of Examples 1-17 includes, wherein the XR device is a head-mounted XR device.

Example 19 is an XR device comprising: at least one processor; and at least one memory storing instructions that, when executed by the at least one processor, cause the XR device to perform operations comprising: capturing, via one or more optical sensors of the XR device, at least one image of a hand of a user of the XR device; processing the at least one image to detect a hand pose relative to the XR device; accessing a hand scale estimate corresponding to the detected hand pose, the hand scale estimate being one of a plurality of hand scale estimates each uniquely associated with a respective hand pose; applying the hand scale estimate to generate positional data for one or more features of the hand of the user; and tracking, based on the positional data, the hand of the user while the user is using the XR device.

Example 20 is one or more non-transitory computer-readable storage media, the one or more non-transitory computer-readable storage media including instructions that, when executed by at least one processor, cause the at least one processor to perform operations comprising: capturing, via one or more optical sensors of an XR device, at least one image of a hand of a user of the XR device; processing the at least one image to detect a hand pose relative to the XR device; accessing a hand scale estimate corresponding to the detected hand pose, the hand scale estimate being one of a plurality of hand scale estimates each uniquely associated with a respective hand pose; applying the hand scale estimate to generate positional data for one or more features of the hand of the user; and tracking, based on the positional data, the hand of the user while the user is using the XR device.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method comprising:

capturing, via one or more optical sensors of an extended reality (XR) device, at least one image of a hand of a user of the XR device;

processing the at least one image to detect a hand pose relative to the XR device;

accessing one or more existing hand scale estimates, each uniquely associated with a respective hand pose;

determining that the detected hand pose does not correspond to any of the one or more existing hand scale estimates;

based on determining that the detected hand pose does not correspond to any of the one or more existing hand scale estimates:

triggering a calibration operation to obtain a hand scale estimate associated with the detected hand pose, and updating the one or more existing hand scale estimates to add the hand scale estimate associated with the detected hand pose;

applying the hand scale estimate associated with the detected hand pose to generate positional data for one or more features of the hand of the user; and tracking, by the XR device and based on the positional data, the hand of the user while the user is using the XR device.

2. The method of claim 1, wherein the detected hand pose is a first hand pose, the hand scale estimate associated with the first hand pose is a first hand scale estimate, and the method further comprises:

after detecting the first hand pose, detecting that the hand of the user has assumed a second hand pose that differs from the first hand pose;

determining that the second hand pose corresponds to one of the respective hand poses associated with the existing hand scale estimates;

accessing, from the existing hand scale estimates, a second hand scale estimate associated with the corresponding one of the respective hand poses, the second hand scale estimate differing from the first hand scale estimate;

applying the second hand scale estimate to generate further positional data for the one or more features of the hand of the user; and further tracking the hand of the user based on the further positional data.

3. The method of claim 1, wherein the one or more optical sensors comprise a plurality of cameras, and the calibration operation is performed in a multi-camera mode.

4. The method of claim 3, wherein the tracking of the hand is performed in a single-camera mode, and the method further comprises:

automatically switching from the multi-camera mode to the single-camera mode after generating of the hand scale estimate.

5. The method of claim 1, wherein the determining that the detected hand pose does not correspond to any of the one or more existing hand scale estimates comprises determining that the detected hand pose does not meet a matching threshold with respect to any the respective hand pose associated with the one or more existing hand scale estimates.

6. The method of claim 1, wherein the one or more existing hand scale estimates comprises a set of existing hand scale estimates, the method further comprising:

identifying, from among the respective hand poses associated with the existing hand scale estimates in the set of existing hand scale estimates, an existing hand pose that is closest to the detected hand pose, the existing hand pose being uniquely associated with an existing hand scale estimate in the set of existing hand scale estimates; and using the existing hand scale estimate associated with the existing hand pose to facilitate the tracking of the hand while the calibration operation is in progress.

7. The method of claim 1, wherein the positional data comprises three-dimensional (3D) positions related to one or more landmarks on the hand that are tracked by the XR device.

8. The method of claim 7, wherein the positional data comprises absolute depth information related to the one or more landmarks, the applying of the hand scale estimate to generate the positional data comprising:

applying the hand scale estimate to obtain the absolute depth information from relative depth information related to the one or more landmarks.

9. The method of claim 8, further comprising, before obtaining the absolute depth information:

executing a neural network to generate the relative depth information based on two-dimensional (2D) positions related to the one or more landmarks.

10. The method of claim 1, wherein the hand scale estimate comprises at least one bone length estimate associated with the hand.

11. The method of claim 10, wherein the calibration operation comprises:

accessing stereo image data for the hand;

processing the stereo image data by performing triangulation on landmarks on the hand; and measuring one or more distances between at least some of the landmarks on the hand to determine the at least one bone length estimate.

12. The method of claim 11, further comprising:

repeating the calibration operation until the at least one bone length estimate meets a predetermined stabilization threshold.

13. The method of claim 1, wherein the tracking of the hand comprises providing, by the XR device, the positional data as input to a machine learning model that is executed to track the hand.

14. The method of claim 1, wherein the processing of the at least one image comprises generating one or more vectors representing the detected hand pose, the one or more vectors being generated based on relative positions of landmarks on the hand.

15. The method of claim 1, wherein each of the respective hand poses is represented by one or more respective vectors.

16. The method of claim 1, further comprising:

generating, by the XR device, virtual content;

determining positioning of the virtual content relative to the hand of the user based on the positional data; and causing presentation of the virtual content to the user.

17. The method of claim 1, wherein the XR device is a head-mounted XR device.

18. An extended reality (XR) device comprising:

at least one processor; and at least one memory storing instructions that, when executed by the at least one processor, cause the XR device to perform operations comprising:

capturing, via one or more optical sensors of the XR device, at least one image of a hand of a user of the XR device;

processing the at least one image to detect a hand pose relative to the XR device;

accessing one or more existing hand scale estimates, each uniquely associated with a respective hand pose;

determining that the detected hand pose does not correspond to any of the one or more existing hand scale estimates;

based on determining that the detected hand pose does not correspond to any of the one or more existing hand scale estimates:

triggering a calibration operation to obtain a hand scale estimate associated with the detected hand pose, and updating the one or more existing hand scale estimates to add the hand scale estimate associated with the detected hand pose;

applying the hand scale estimate associated with the detected hand pose to generate positional data for one or more features of the hand of the user; and tracking, based on the positional data, the hand of the user while the user is using the XR device.

19. The XR device of claim 18, wherein the one or more optical sensors comprise a plurality of cameras, the calibration operation is performed in a multi-camera mode, the tracking of the hand is performed in a single-camera mode, and the operations further comprise:

automatically switching from the multi-camera mode to the single-camera mode after generating of the hand scale estimate.

20. One or more non-transitory computer-readable storage media, the one or more non-transitory computer-readable storage media including instructions that, when executed by at least one processor, cause the at least one processor to perform operations comprising:

capturing, via one or more optical sensors of an extended reality (XR) device, at least one image of a hand of a user of the XR device;

processing the at least one image to detect a hand pose relative to the XR device;

accessing one or more existing hand scale estimates, each uniquely associated with a respective hand pose;

determining that the detected hand pose does not correspond to any of the one or more existing hand scale estimates;

based on determining that the detected hand pose does not correspond to any of the one or more existing hand scale estimates:

triggering a calibration operation to obtain a hand scale estimate associated with the detected hand pose, and updating the one or more existing hand scale estimates to add the hand scale estimate associated with the detected hand pose;

applying the hand scale estimate associated with the detected hand pose to generate positional data for one or more features of the hand of the user; and tracking, based on the positional data, the hand of the user while the user is using the XR device.

\* \* \* \* \*